US012698188B2

(12) United States Patent
Elliott et al.

(10) Patent No.: US 12,698,188 B2
(45) Date of Patent: Aug. 4, 2026

(54) LOAD-SENSING VEHICLE LIFT

(71) Applicant: Vehicle Service Group, LLC, Madison, IN (US)

(72) Inventors: Robert Elliott, Madison, IN (US); Steven Taylor, Madison, IN (US)

(73) Assignee: Vehicle Service Group, LLC, Madison, IN (US)

( * ) Notice: Subject to any disclaimer, the term of this patent is extended or adjusted under 35 U.S.C. 154(b) by 753 days.

(21) Appl. No.: 17/875,136

(22) Filed: Jul. 27, 2022

(65) Prior Publication Data

US 2022/0356051 A1 Nov. 10, 2022

Related U.S. Application Data

(63) Continuation-in-part of application No. 17/353,975, filed on Jun. 22, 2021, now Pat. No. 12,054,373, (Continued)

(51) Int. Cl.
*B66F 9/22* (2006.01)
*B66F 7/16* (2006.01)

(Continued)

(52) U.S. Cl.
CPC .................. *B66F 7/16* (2013.01); *B66F 9/04* (2013.01); *B66F 9/22* (2013.01); *F15B 13/02* (2013.01);

(Continued)

(58) Field of Classification Search
CPC .... B66F 9/22; B66F 7/28; F15B 2211/20515; F15B 21/14; F15B 2211/40515;

(Continued)

(56) References Cited

U.S. PATENT DOCUMENTS 4,278,411 A * 7/1981 Anderson ............. B29C 41/365 425/100
8,083,034 B2 * 12/2011 Bordwell .................. B66F 7/20 187/210

(Continued)

FOREIGN PATENT DOCUMENTS

CN 107140589 A 5/2002
CN 103671310 A 3/2014

(Continued)

OTHER PUBLICATIONS

Chinese Office Action dated Dec. 6, 2023, for Application No. 202080039649.8, 12 pages.

(Continued)

*Primary Examiner* — Mahdi H Nejad
(74) *Attorney, Agent, or Firm* — FBT Gibbons LLP

(57) ABSTRACT

A lift system includes a lift structure and a lift structure actuation assembly. The lift structure can actuate between a lowered position and a raised position. The lift structure actuation assembly includes a hydraulic cylinder operably coupled with the lift structure, a motor, a hydraulic pump powered by the motor, and a flow control assembly that can limit hydraulic fluid exiting the hydraulic cylinder to a maximum volumetric flow rate. The hydraulic pump can pump hydraulic fluid into the hydraulic cylinder in order to raise the lift structure. The lift structure actuation assembly can lower the lift structure in a fast descent mode and a slow descent mode. In the slow descent mode, the hydraulic pump pumps hydraulic fluid toward the hydraulic cylinder such that the hydraulic fluid exits the hydraulic cylinder at a slower volumetric flow rate compared to the maximum volumetric flow rate.

19 Claims, 23 Drawing Sheets

Related U.S. Application Data which is a continuation-in-part of application No. PCT/US2020/034847, filed on May 28, 2020.

(60) Provisional application No. 62/853,240, filed on May 28, 2019.

(51) Int. Cl.

| | |
|---|---|
| ***B66F 9/04*** | (2006.01) |
| ***F15B 13/02*** | (2006.01) |
| ***F15B 15/18*** | (2006.01) |
| *B66F 7/20* | (2006.01) |

(52) U.S. Cl.
CPC ................ *F15B 15/18* (2013.01); *B66F 7/20* (2013.01); *F15B 2211/75* (2013.01)

(58) Field of Classification Search
CPC ........ F16H 61/423; F16H 61/46; F16H 61/47; F16H 61/42; B60W 10/10
USPC ....... 187/224, 247, 275; 180/307, 242, 6.48, 180/420, 197
See application file for complete search history.

(56) References Cited

U.S. PATENT DOCUMENTS

| | | | | | |
|---|---|---|---|---|---|
| 11,305,972 | B1 * | 4/2022 | Elliot | B66F 7/28 | |
| 2001/0030085 | A1 * | 10/2001 | Nagata | B66F 9/22 | 187/222 |
| 2003/0056508 | A1 * | 3/2003 | Fan | F15B 7/04 | 60/431 |
| 2003/0136124 | A1 * | 7/2003 | Albert | F15B 20/008 | 60/477 |
| 2004/0124391 | A1 * | 7/2004 | Takekata | F16K 31/602 | 251/231 |
| 2004/0149520 | A1 * | 8/2004 | Taylor | B66F 7/20 | 187/203 |
| 2005/0182522 | A1 | 8/2005 | Chase | | |
| 2006/0191405 | A1 * | 8/2006 | Itose | B66F 9/22 | 91/476 |
| 2008/0128214 | A1 * | 6/2008 | Tahashi | B66F 9/24 | 187/290 |
| 2016/0002017 | A1 * | 1/2016 | Ueda | B66F 9/22 | 414/642 |
| 2018/0273364 | A1 * | 9/2018 | Yahner | B66F 9/07559 | |
| 2018/0354760 | A1 * | 12/2018 | Elliott | G01S 5/0289 | |
| 2019/0084816 | A1 * | 3/2019 | Stolten | B66F 9/22 | |
| 2021/0309499 | A1 | 10/2021 | Elliott et al. | | |
| 2023/0059303 | A1 * | 2/2023 | Bachmaier | F15B 21/008 | |

FOREIGN PATENT DOCUMENTS

| | | | | |
|---|---|---|---|---|
| DE | 3629089 | A1 | * | 3/1988 |
| JP | H06-42893 | U | | 6/1994 |
| JP | H07-163190 | A | | 6/1995 |
| JP | H07-196292 | A | | 8/1995 |
| JP | H07-269143 | A | | 10/1995 |
| JP | 2001275434 | A | * | 10/2001 |
| JP | 2005-225594 | A | | 8/2005 |
| WO | WO 2002/034665 | A2 | | 5/2002 |
| WO | WO 2012/165236 | A1 | | 12/2012 |

OTHER PUBLICATIONS

International Search Report and Written Opinion dated Jan. 29, 2021, for International Application No. PCT/US2020/034847, 20 pages.

Chinese Office Action and Search Report dated Apr. 27, 2024, for Application No. 202080039649.8, 14 pages.

Chinese Office Action and Search Report dated Mar. 4, 2023, for Application No. 202080039649.8, 12 pages.

* cited by examiner

LOAD-SENSING VEHICLE LIFT

REFERENCE TO RELATED APPLICATIONS

This is a continuation-in-part of U.S. patent application Ser. No. 17/353,975, entitled "Load-Sensing Vehicle Lift," filed on Jun. 22, 2021, which is a continuation-in-part of International Application No. PCT/US2020/034847, entitled "Load-Sensing Vehicle Lift," filed on May 28, 2020, which claims priority of U.S. Provisional Patent Application 62/853,240.

FIELD

The disclosed technology pertains to a system for automatically controlling speed of a vehicle lift.

BACKGROUND

Vehicle lifts have varying designs and capabilities, including drive-on or in-ground lifts that lift a parked vehicle by raising the parking surface in order to allow access to the underside of the vehicle, as well as frame-engaging lifts that raise a vehicle by contacting structural lifting points on the underside frame of the vehicle, which allow access to the underside of the vehicle and allow wheels and tires to be removed or serviced.

Lifting vehicles during service can be a time-consuming and labor-intensive process. Technicians must properly position a vehicle relative to the lift and ensure that the lift arms or other lift structure is properly engaging the vehicles lift points prior to lifting the vehicle, which can take several minutes. The time required to lift a vehicle may depend on the particular type of vehicle lift being used and its capabilities and may typically reach 1-2 minutes depending upon the desired lift height. During lifting, a technician must continuously observe the lift, and may also be required to continuously engage a switch, lever, or other lift control.

A technician in a high-volume service environment may lift thirty or more vehicles per day, meaning that a single technician may spend upwards of an hour during the day activating a button or lever and observing a lift in motion. In a service environment with ten vehicle lifts, this may amount to ten or more hours of labor per day. As can be seen, increasing the speed at which a lift can raise a vehicle can provide significant savings of time for a service environment. For example, even a 20% increase in lifting speed may reduce labor costs in a ten-lift operation by about two hours per day, or more than 700 hours per year.

What is needed, therefore, is an improved lift that allows for variable lift speed.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of vehicle lifts. While the disclosed applications of the inventors' technology satisfy a long-felt but unmet need in the art of automatic vehicle lifts, it should be understood that the inventors' technology is not limited to being implemented in the precise manners set forth herein, but it could be implemented in other manners without undue experimentation by those of ordinary skill in the art in light of this disclosure. Accordingly, the examples set forth herein should be understood as being illustrative only and should not be treated as limiting.

Figure 1:
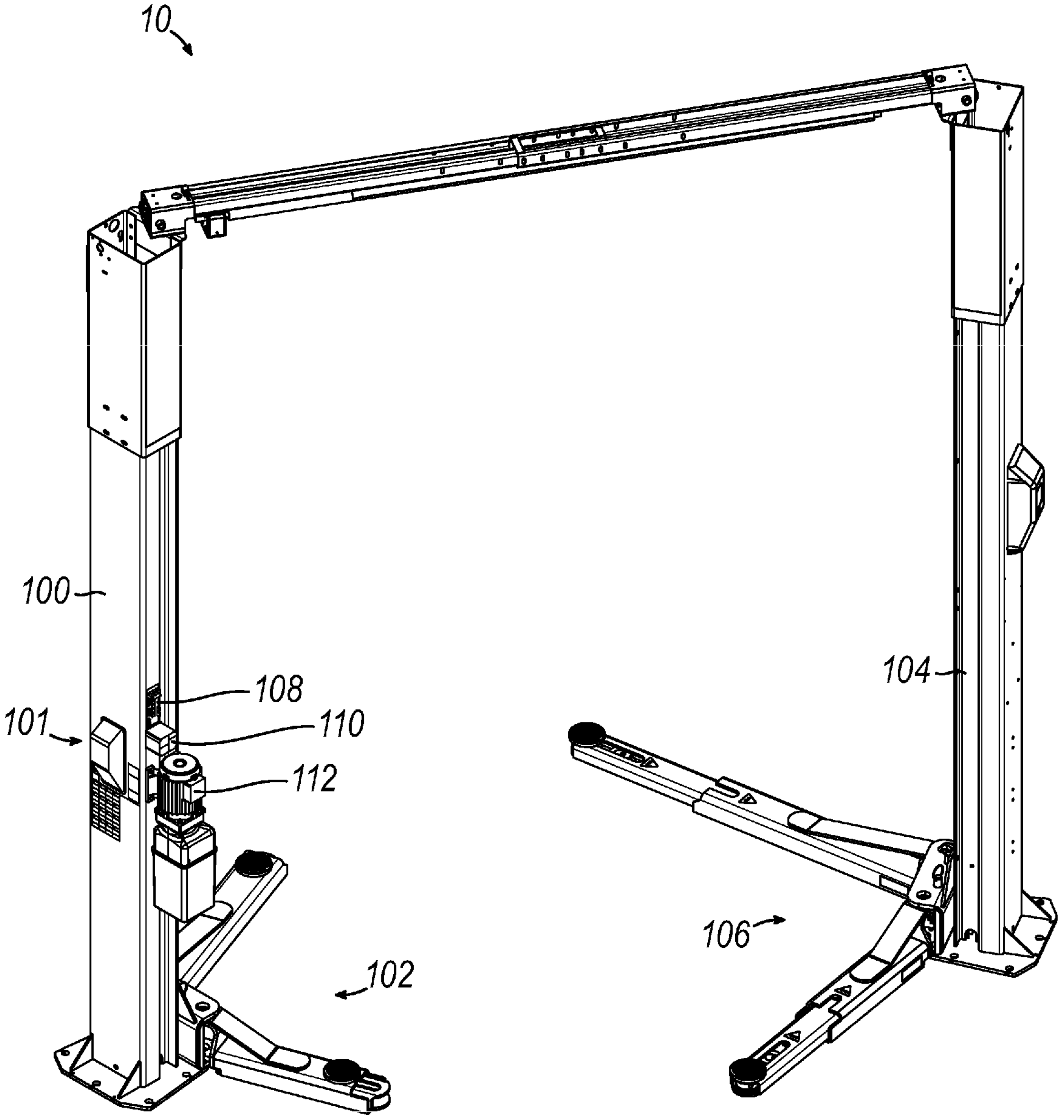
FIG. 1 is a perspective view of an exemplary lift.

Turning now to the figures, FIG. 1 shows an exemplary lift (10) that can be used to raise a vehicle and allow access to the underside of the vehicle for a variety of maintenance tasks. The lift (10) includes a pair of lift posts (100, 104), each lift post having a lift structure (102, 106). A set of control components (101) of the lift (10), shown in a magnified view in FIG. 2, includes a lift controller (108), a variable frequency drive (110), and a motor (112). Some implementations of the set of control components (101) may not include each component shown in FIG. 2, and may also include additional components, as will be described in more detail below. The lift (10) may be connected to a power supply (not pictured) to provide power to the electrical components of the lift. An appropriate power supply may vary depending upon the particular implementation of the lift (10), but may include power supplies such as a single-phase, 220-volt AC 20-amp service, a service with 3-phase voltage, a service with DC voltage, or other services that may be configured to provide appropriate voltage, currency, and frequency, as may be available in a particular service environment, country, or other application.

The lift controller (108) may be one or more of a computer, circuit board, microcontroller, programable logic controller, mobile device, smart phone, tablet device, proprietary device, or other device having one or more capabilities such as sending, receiving, analyzing, storing, and modifying data, executing programming or other logic instructions, and providing control signals or other control instructions to coupled devices. The variable frequency drive (110) may receive power from an attached power supply and may, based upon its own logic controller, based upon instructions from the lift controller (108), or based upon both, may condition (e.g., by varying one or more of frequency, current, and voltage) and provide power to the motor (112) in order to control the operation of the motor (112).

The motor (112) may be operated based upon one or more of its own logic controller, the lift controller (108), or the variable frequency drive (110), in order to raise and lower the lift structures (102, 106). The motor (112) may be, for example, a 3-phase motor, a single-phase motor, a DC voltage motor, or other type of motor as may be appropriate for a particular lift, service environment, country, or other application. The motor (112) may raise and lower the lift structures (102, 106) by producing mechanical energy that is translated to a lifting motion of the lift structures (102, 106) through a mechanical linkage, hydraulic system, or other system as will be apparent to one of ordinary skill in the art in light of this disclosure.

Figure 2:
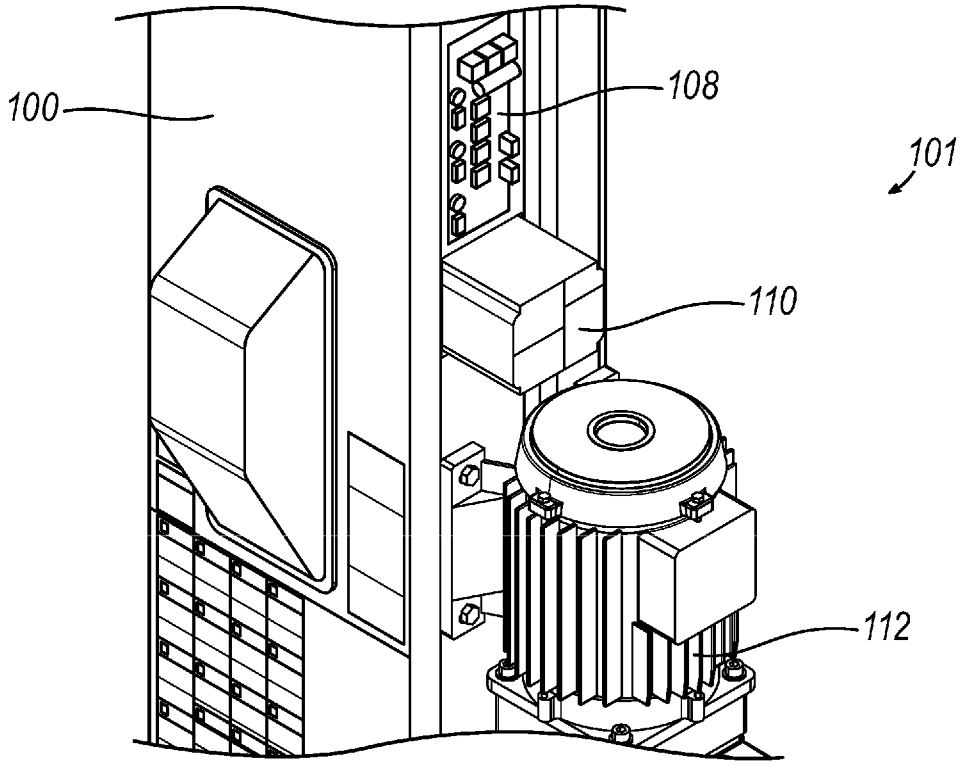
FIG. 2 is a perspective view of a set of control components of the lift of FIG. 1.

While the lift (10) shown in FIGS. 1 and 2 is usable with the technology disclosed herein, it should be understood that various other types of lifts are also usable, including, for example, four-post lifts, in-ground lifts, scissor lifts, portable lifts, and other types of frame-engaging and wheel-engaging lifts having an electrically driven lift feature such as the motor (112). In some implementations, the motor (112) will be operable at varying levels of torque and power depending upon the characteristics of electrical input received from the power supply. Conventionally, electrically driven lift systems are designed and rated around a maximum weight capacity, and as such the speed of a motor driving such a conventional system will typically be selected and configured based upon the maximum weight capacity.

As an example, a lift system rated to lift a ten-thousand-pound vehicle will have a motor that is configured to raise the lift at a static speed that such a system's motor is capable of for a 10,000-pound vehicle, without exceeding the motor's ability to safely receive electrical energy and transform it into mechanical energy, which might cause the motor to overheat or otherwise be damaged or may simply exceed the motor's maximum torque. While operating at this static speed is appropriate for a 10,000-pound vehicle, it may result in unnecessarily slow lifting speeds for vehicles weighing less than 10,000 pounds. For example, if the same lift is used to raise a 5000-pound vehicle, the motor may provide the same static raising speed, while being capable of speeds approximately twice as fast. With many common passenger vehicles being between 2500 and 3500 pounds, it can be seen that highly rated lifts may be producing unnecessarily slow lift speeds for many of the vehicles they are used with.

Figure 3:
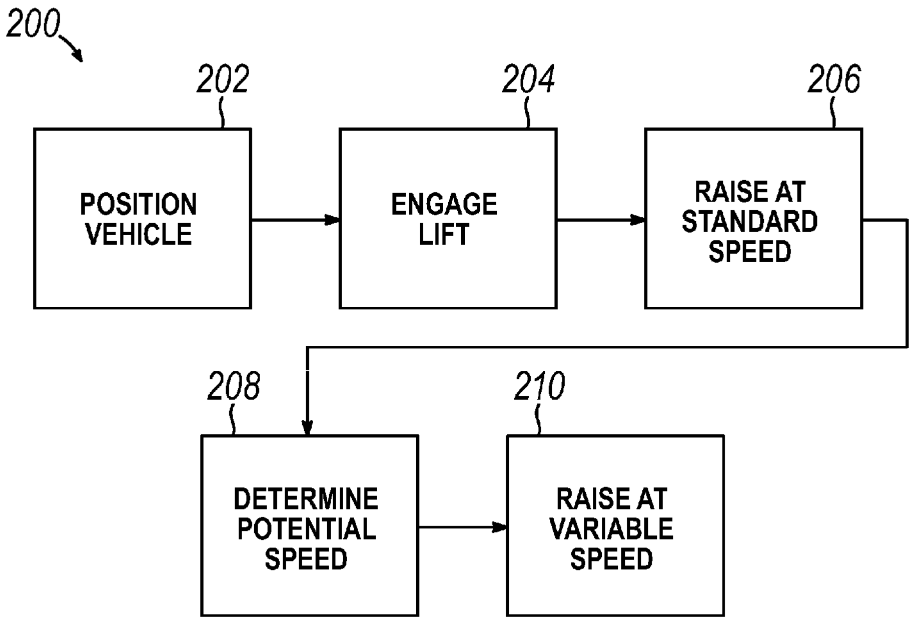
FIG. 3 is a flowchart of an exemplary set of steps that may be performed with the lift of FIG. 1 in order to control the lift with variable lift speed.

To improve upon conventional limitations, the lift (10) of FIG. 1 includes a control system that is capable of reactively optimizing lift speed by adjusting between constant torque and constant horsepower based on the weight of a particular vehicle, based upon a user control, or both. For example, FIG. 3 shows a flowchart of an exemplary set of steps (200) that may be performed with a lift such as the lift (10) of FIG. 1 in order to control a lift at a variable, optimized lift speed. One or more of the steps may be performed by or with the lift controller (108), the variable frequency drive (110), the motor (112), or other components, and in some implementations may be performed by one or more such components configured as a speed controller. The steps (200) include positioning (202) a vehicle appropriately relative to the lift (10), which may include a technician piloting a vehicle into a position where the lift structures (102, 106) can reach the vehicle lifting points. The lift (10) may then engage (204) the vehicle lift points, which may include a manual or automated rotation, extension, or elevation of one or more portions of the lift structures (102, 106) until they contact or nearly contact the vehicle lift points. The lift (10) may then be operated (e.g., manually by a user interacting with a switch, lever, pendant, wireless controller, or other device in communication with the set of control components (101), or automatically by a lift automation system in communication with the set of control components (101)) to cause the lift structures (102, 106) to raise (206) at a standard or default speed so that the vehicle is lifted from the floor and the full weight of the vehicle is borne by the lift structures (102, 106).

When the vehicle is fully supported by the lift structures (102, 106), one or more components (e.g., the lift controller (108), the variable frequency drive (110)) of the set of control components (101) may determine (208) the potential rising speed based upon feedback to the set of control components (101) produced during lifting of the full weight of the vehicle. This may include, for example, a load signal, load information, or a load measurement (referred to herein as a "load") indicating an amount of current or power drawn from the power supply while raising (206) the vehicle (initially at the standard speed), a measured weight of the vehicle supported by the lift structures (102, 106), the pressure produced by a hydraulic system raising the vehicle, or other information associated with the load of the vehicle on the lift structures (102, 106), one or more of which may be used to determine the maximum potential speed the motor may operate at without stalling or damaging itself. With the potential raising speed determined (208), the set of lift components (101) may then begin to raise (210) the lift structures (102, 106) at a variable speed, such as the determined (208) potential rising speed or a lesser configured maximum speed (e.g., to prevent movement of the lift at unsafe speeds when there is no load or a very light load).

Figure 4A:
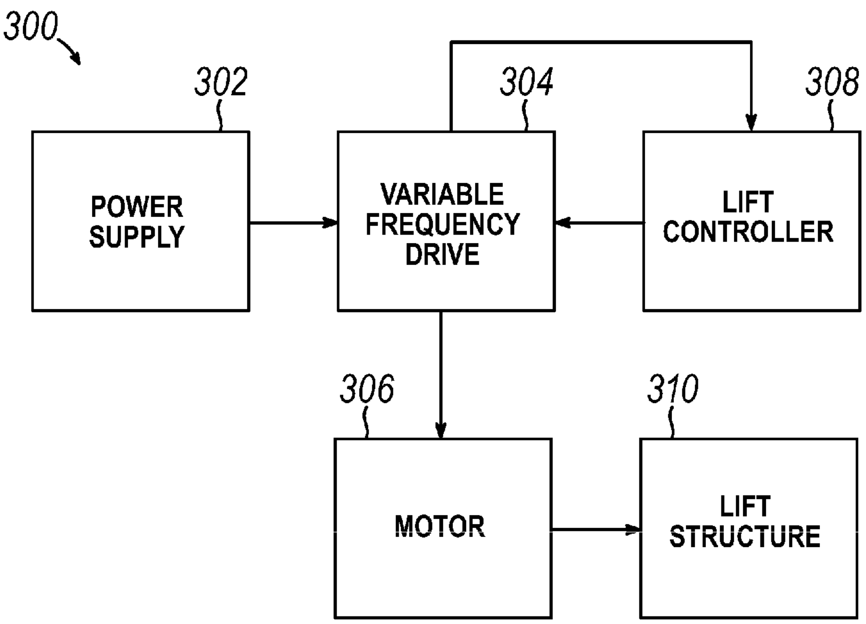
FIG. 4A is a schematic diagram of an exemplary arrangement of control components usable to vary lift speed using a variable frequency drive.

The set of control components (101) may be configured and arranged in various ways in order to determine (208) the potential raising speed when the vehicle load is supported by the lift structures (102, 106). For example, FIG. 4A shows a schematic diagram of an exemplary arrangement of control components (300) usable to vary lift speed. A power source (302) may have substantially similar features as the power source described above in relation to FIG. 1 and may be configured to provide electrical power to the control components (300). A variable frequency drive (304), having substantially similar features as the variable frequency drive (110), may receive electrical power from the power supply (302) and, based upon input from a lift controller (308), operate a motor (306). The lift controller (308) may have substantially similar features to the lift controller (108), while the motor (306) may have substantially similar features to the motor (112). Operation of the motor (306) may cause a lift structure (310) to be raised. The lift structure (310) may be, for example, the lift arms of a two-post lift, such as the lift structures (102, 106), a wheel-engaging structure of various types of lift, a frame-engaging structure of various types of lift, or other suitable structural lifting mechanism.

During operation of the motor (306) (e.g., as a result of a manual input via a button, lever, or other user device, or as a result of an automated movement), the lift controller (308) will transmit a control signal (e.g., a speed command in hertz) to the variable frequency drive (304) indicating operational characteristics (e.g., torque, power, rotational speed) at which the motor (306) should operate in order to raise the lift structure (310) at the desired rate of speed, which may be, for example, a standard or default speed for the lift such as the weight-rated speed. In response to the signal, the variable frequency drive (304) will draw electrical power from the power supply (302), condition the electrical power for use by the motor (306) to produce the desired raise speed, and provide the electrical power to the motor (306).

The magnitude of electrical power (e.g., in amperes) drawn by the variable frequency device (304) will depend upon the amount of power required to raise the lift structure (310) and any load thereon, which, in normal circumstances (e.g., excluding hardware malfunctions, poor maintenance, high heat, and other exceptional factors as will occur to those skilled in the art) will substantially depend upon the weight of the vehicle or other load being raised. The variable frequency drive (304) may determine the magnitude of electrical power drawn and provide such information via a feedback signal to the lift controller (308), which may adjust the control signal (e.g., a speed command in hertz) being provided to the variable frequency drive (304) in order to increase the amount of electrical power drawn, resulting in an increase in raise speed.

In effect, the control components (300) determine (208) the potential speed by using a feedback loop between the lift controller (308) and the variable frequency drive (304), where the maximum raising speed of the lift structure (310) is determined for a particular vehicle or load based upon drawn electrical power, and then lift the vehicle at (or closer to) that speed. This feedback loop may determine and increase the speed with a single cycle (e.g., the maximum speed may be determined and adjusted to directly from the standard speed) or in multiple cycles (e.g., the speed may be adjusted incrementally over several cycles until a maximum speed, goal speed, or other configured speed is reached).

Figure 4B:
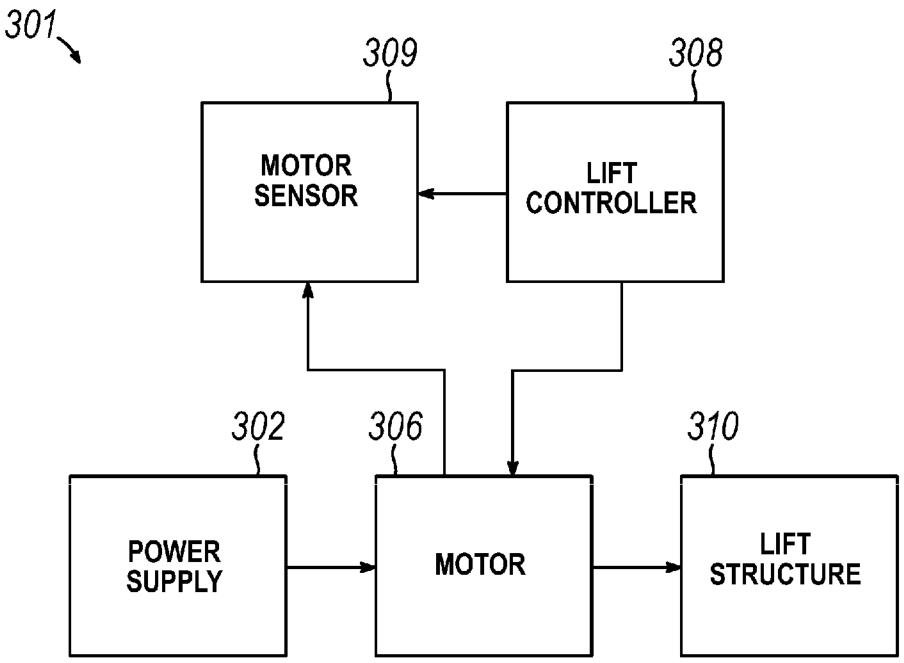
FIG. 4B is a schematic diagram of an alternative exemplary arrangement of control components usable to vary lift speed using pulse width modulation.

Other variations exist on the arrangement, configuration, and capabilities of control components that will be suitable for determining (208) the potential speed. As an example, FIG. 4B shows a schematic diagram of an alternative exemplary arrangement of control components (301) usable to vary lift speed. The control components (301) of FIG. 4B share several features with the control components (300) of FIG. 4A, including the motor (306), the lift structure (310), the power supply (302), and the lift controller (308). The lift controller (308) may be configured to provide control signals to the motor (306) in order to cause the motor (306) to draw power from the power supply (302) and operate to raise or lower the lift structure (310). In order to provide variable lift performance (e.g., such as the variable speed (210)), the lift controller (308) may be configured to provide pulse width modulation (PWM) of the control signals transmitted to the motor (306) in order to vary and achieve a desired operating speed for the motor (306).

The control components (301) also include a motor sensor (309) that is coupled to the motor (306) and configured to determine one or more characteristics of the motor's (306) current operation. The motor sensor (309) could be implemented as, for example, one or more of a tachometer monitoring commutation of the motor (306) shaft or other movable component, a hall-effect sensor monitoring electrical outputs of the motor (306) indicative of performance, a back EMF sensor monitoring electrical outputs of the motor (306) indicative of performance, or other sensors configured to measure mechanical, electrical, or other characteristics of the motor (306). Output from the motor sensor (309) may be provided to the lift controller (308) and used (e.g., as part of a continuous or intermittent feedback loop) to produce PWM control signals that will cause the lift to raise at the desired speed (e.g., the variable speed (210)) based upon the determined (208) potential speed. As arranged in FIG. 4B, the control components (301) do not require the variable frequency drive (304), and so such an implementation may be used as an alternative to, or redundant addition to, the control components (300) of FIG. 4A.

Figure 5A:
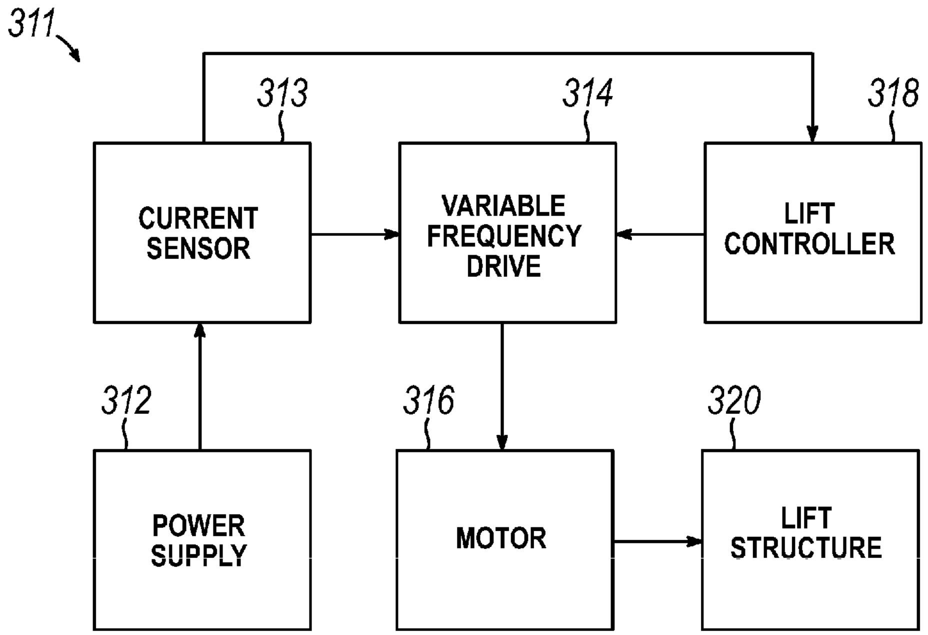
FIG. 5A is a schematic diagram of an alternative exemplary arrangement of control components, including an exemplary current sensor, usable to vary lift speed.

As another example of a variation, FIG. 5A shows a schematic diagram of an alternative exemplary arrangement of control components (311) usable to vary lift speed. The control components (311) include a current sensor (313) receiving electrical power from a power supply (312), which has substantially similar features to the power supply (302), a variable frequency drive (314), which has substantially similar features to the variable frequency drive (304), a motor (316), which has substantially similar features to the motor (306) and is operable to raise a lift structure (320), which has substantially similar features to the lift structure (310), and a lift controller (318), which has substantially similar features to the lift controller (308).

The control components (311) operate similarly to the control components (300) shown in FIG. 4A, except that the current sensor (313) is placed inline and detects the magnitude of the electrical current drawn from the power supply (312) by the variable frequency drive (314) and provides such information to the lift controller (318) in order to produce the variable speed feedback loop. In this manner, the lift controller (318) may, based upon one or more measurements of electrical current from the current sensor (313), determine (208) a potential raise speed, and provide signals to the variable frequency drive (314) to cause it to operate the motor (316) accordingly. While some conventional variable frequency drives are capable of detecting and reporting drawn electrical power (e.g., such as the variable frequency drive (304)), others are not. Several advantages provided by the control components (311) include enabling a feedback loop when the variable frequency drive (314) is incapable of reporting electrical power draw to the lift controller (318), providing redundant reporting of electrical power draw to improve upon accuracy or stability, providing more immediate reporting of electrical power draw to the lift controller (318) (e.g., as the current sensor (313) may be positioned and configured to provide information to the lift controller (318) more rapidly than the variable frequency drive (314)).

Figure 5B:
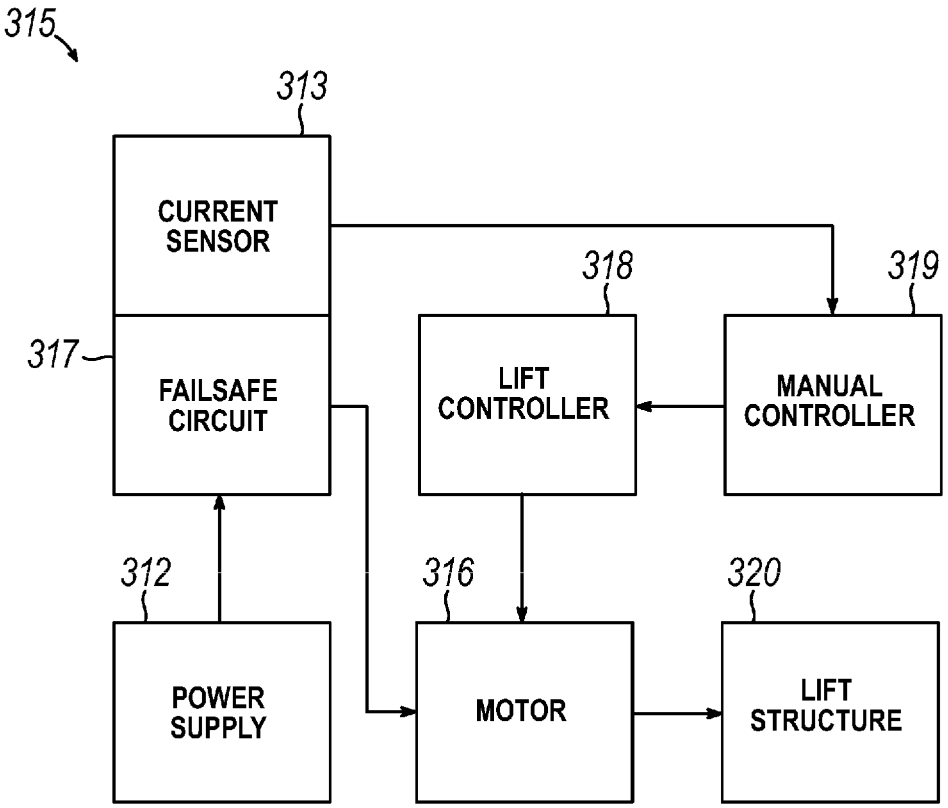
FIG. 5B is a schematic diagram of an alternative exemplary arrangement of control components, including a current sensor and user control, usable to vary lift speed.
Figure 12:
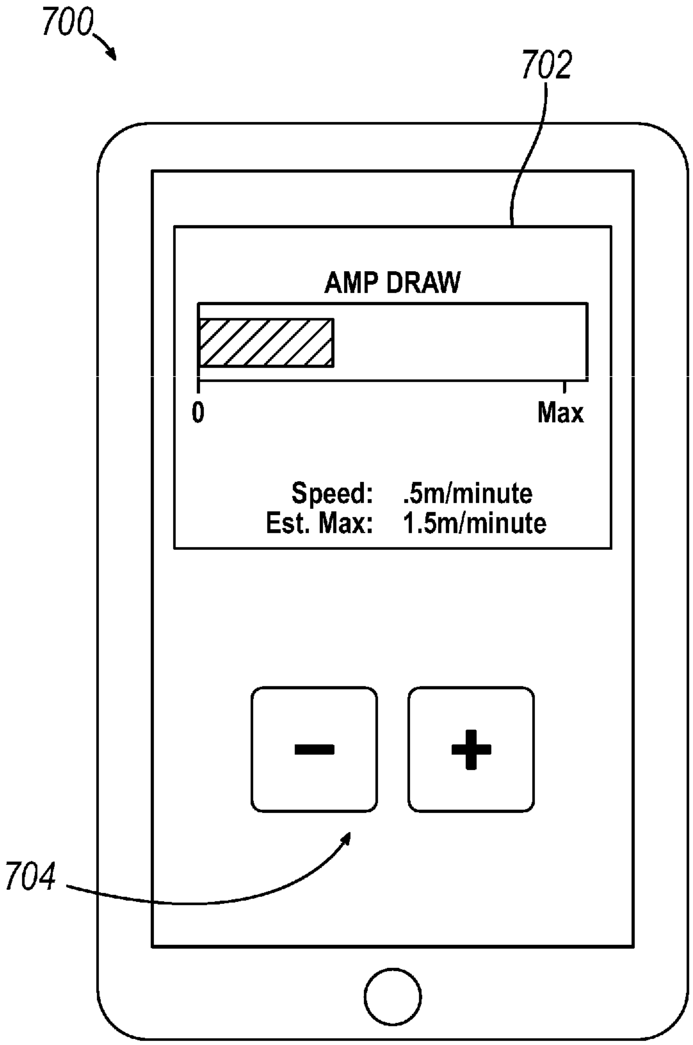
FIG. 12 is a schematic diagram of an exemplary manual control.

As another example of a variation on the control components, FIG. 5B shows a schematic diagram of an alternative exemplary arrangement of control components (315). The control components (301) of FIG. 4B share several features with the control components (311) of FIG. 5A, including the motor (316), the lift structure (320), the power supply (312), the lift controller (318), and the current sensor (313). The control components (315) are configured to allow for manual determination and control of the variable speed (210) via a manual control (319) that is in communication with the lift controller (318). A schematic diagram of an exemplary manual control (700) is shown in FIG. 12, which includes a display (702) and a speed control (704) illustrated as two buttons that may selectively increase or decrease, respectively, the speed of the lift. As can be seen, the display (702) shows a bar graph illustrating the current amp draw of the lift relative to the maximum amp draw. In some implementations, the display (702) may also show the lift's current speed (e.g., such as may be determined or estimated as described elsewhere herein) as well as a determined (208) maximum speed.

A user's interactions with manual control (319) (e.g., such as by the speed control (704)) will cause the manual control (319) to provide control signals to the lift controller (318). The lift controller (318) itself is configured to provide control signals to the motor (316) to cause the motor (316) to draw power from the power supply (312) and operate, and lift controller (318) may be additionally configured to produce and provide those control signals based upon the control signals from the manual control (319). In this manner, a user may manually control the lift speed via the manual control (319) while observing the lift's speed, amp draw, or other detectable characteristics until a desired speed is reached. The control components (315) additionally include a failsafe circuit (317) that may be, for example, a fuse, thermal switch, or other circuit protector configured to prevent a dangerous amount of draw from the power supply (312). When a hazardous condition is detected, the failsafe circuit (317) may, for example, reduce the current lift speed or prevent further increase of the current lift speed, or may disable operation of the lift entirely. The manual control (319) and current sensor (313) may be in wireless or wired communication with each other, and they may be in direct communication or indirect communication (e.g., via the lift controller (318)), as will be apparent to those of ordinary skill in the art in light of this disclosure.

Figure 6:
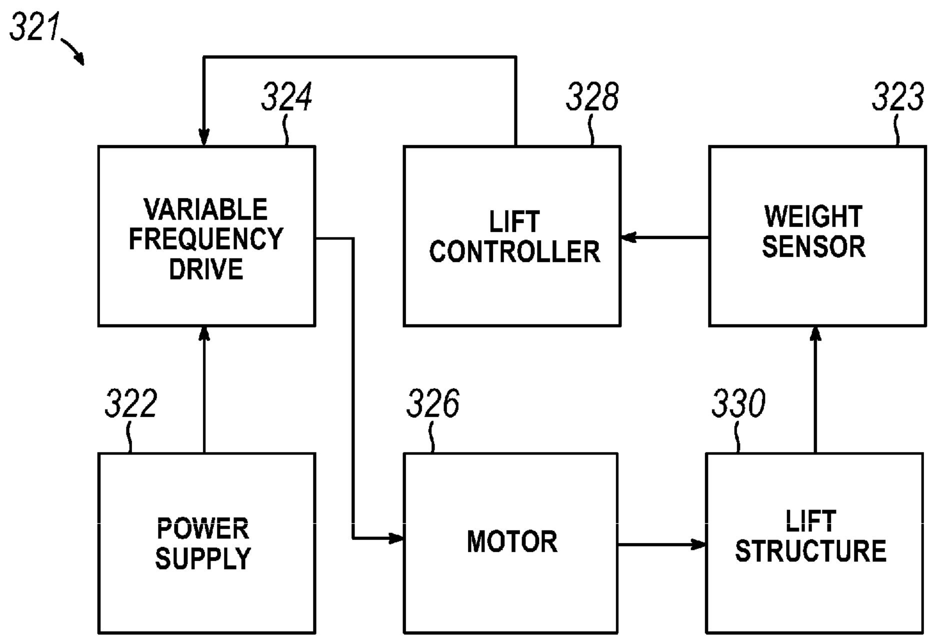
FIG. 6 is a schematic diagram of an alternative exemplary arrangement of control components, including an exemplary weight sensor, usable to vary lift speed.

As another example of a variation on the control components, FIG. 6 shows a schematic diagram of an alternative exemplary arrangement of control components (321) usable to vary lift speed. The variation shown in FIG. 6 includes a power supply (322), a variable frequency drive (324), a motor (326), a lift controller (328), and a lift structure (330), each having substantially similar features as the corresponding components describes in the context of FIG. 4A (e.g., the power supply (302), the variable frequency drive (304), the motor (306), the lift controller (308), and the lift structure (310)). Also shown in FIG. 6 is a weight sensor (323), which is connected to the lift structure (330) and configured to sense the weight of loads supported by the lift structure (330).

When the lift structure (330) supports a load while the lift is raised at a standard speed, the weight sensor (323) determines the weight of the load and provides a signal to the lift controller (328) indicating the weight of the load. The lift controller (328) may use the determined weight of the load to query against or compare to a database or dataset to determine (208) a potential speed for the lift raise operation. Table 1 shows an exemplary correlation table that the lift controller (328) may use to determine potential speed based upon information from the weight sensor (323), which may be usable for a lift with a maximum current draw of 20 amps that is configured to operate at a standard speed suitable for a 10,000-pound vehicle. The first column shows current draw for vehicles of various weights at a standard raising speed, the second column shows vehicle weight associated with that current draw, and the third column shows a max potential speed for a vehicle of that weight expressed as a percentage of the standard speed. It should be understood that the potential speed may be determined (208) in other ways than using a correlation table such as that shown in Table 1, and such variations will be apparent to one of ordinary skill in the art in light of the disclosure herein. A correlation table such as that shown in Table 1 may be built or configured manually at the time of lift manufacture or installation, or it may be built in real time using a lift with a control system having, for example, the current sensor (313) and the weight sensor (323), as will be described in more detail below.

TABLE 1

| Exemplary Load Weight Correlation Table | | |
|---|---|---|
| Standard Speed Draw (Amps) | Vehicle Weight (lbs) | Max Potential Speed |
| 5 | 2,500 | 400% |
| 10 | 5,000 | 200% |
| 15 | 7,500 | 133% |
| 20 | 10,000 | 100% |

Figure 7:
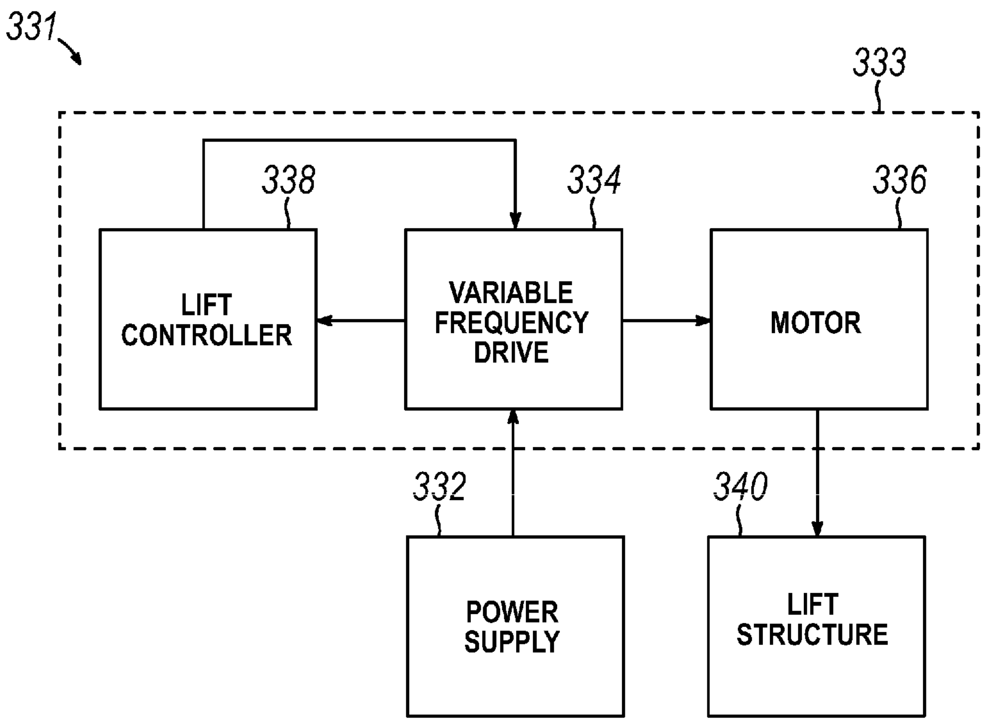
FIG. 7 is a schematic diagram of an alternative exemplary arrangement of control components, including an exemplary integrated power unit, usable to vary lift speed.

As yet another example, FIG. 7 shows a schematic diagram of an alternative exemplary arrangement of control components (331) usable to vary lift speed. The variation shown in FIG. 7 includes a power supply (332), a variable frequency drive (334), a motor (336), a lift controller (338), and a lift structure (340), each having substantially similar features as the corresponding components describes in the context of FIG. 4A (e.g., the power supply (302), the variable frequency drive (304), the motor (306), the lift controller (308), and the lift structure (310)). Also shown in FIG. 7 is an integrated power unit (IPU) (333), which may be a single case or component that includes related components such as the lift controller (338), the variable frequency drive (334), and the motor (336). Determining (208) potential speed using the integrated power unit (333) may function similarly to FIGS. 4A through 5B, in that a determined magnitude of electrical power draw may be used with a feedback loop in order to determine and adjust to a potential speed. An advantage of the integrated power unit (333) may include the ability to couple and position the lift controller (338) and variable frequency drive (334) in a fashion that shortens the distance traveled by signals traveling through communication paths therebetween and improves the speed and efficiency at which the feedback loop signals are transmitted between the lift controller (338) and the variable frequency drive (334). Another advantage of the integrated power unit (333) may be the ease of retrofitting a pre-existing lift to allow for variable raising speeds, such as where the case of the integrated power unit (333) is adapted to be coupled to a motor mount on a lift structure (350).

Figure 8A:
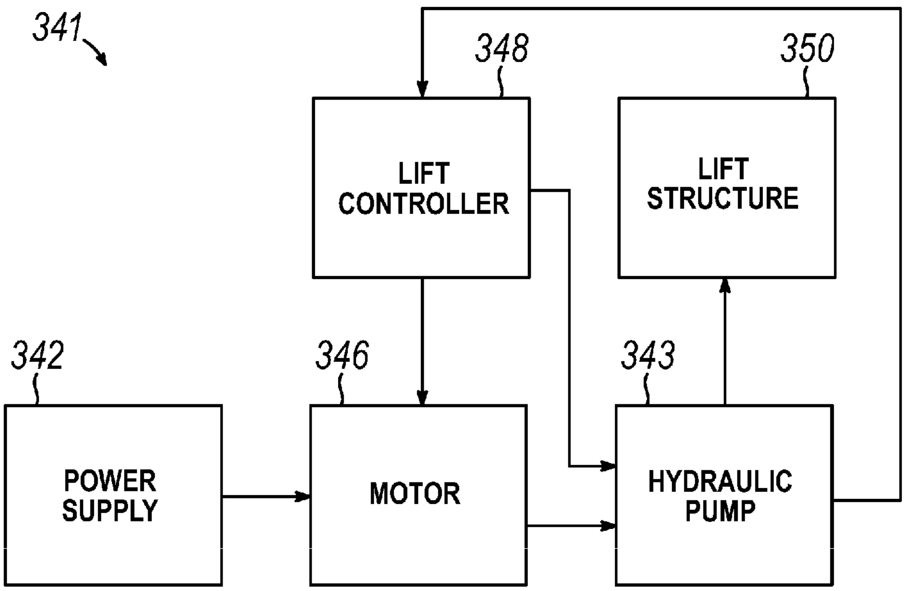
FIG. 8A is a schematic diagram of an alternative exemplary arrangement of control components, including an exemplary hydraulic pump, usable to vary lift speed.

As another example of a set of control components, FIG. 8A shows a schematic diagram of an alternative exemplary arrangement of control components (341) usable to vary lift speed. The variation shown in FIG. 8A includes a power supply (342), a motor (346), a lift controller (348), and a lift structure (350), each having substantially similar features as the corresponding components described in the context of FIG. 4A (e.g., the power supply (302), the motor (306), the lift controller (308), and the lift structure (310)). Also included is a hydraulic pump (343) that is operable by one or more of the motor (346) and the lift controller (348) to raise the lift structure (350). The hydraulic pump (343) may be, for example, a variable displacement hydraulic pump that is powered by the motor (346) and operates at varying flowrates in order to vary lift speed based upon a signal from the lift controller (348).

When the hydraulic pump (343) operates at a standard raise speed, a pressure sensor of the hydraulic pump (343) may sense a level of hydraulic pressure within the system that is correlated with the weight of the load being carried by the lift structure (350). As with the examples of FIG. 6, information that is indicative of a weight of the load carried by the lift structure (350) may be used to determine (208) a potential raise speed by querying or comparing against a database or dataset of values. Table 2 below shows an example of a pressure correlation table that may be used to determine (208) a potential raise speed. The first column shows a percentage of maximum operational pressure sensed by the hydraulic pump (343) for vehicles of various weights at a standard raising speed, the second column shows vehicle weight associated with that pressure, and the third column shows a maximum potential speed for a vehicle of that weight expressed as a percentage of the standard speed.

TABLE 2

| Exemplary Pump Pressure Correlation Table | | |
|---|---|---|
| Pressure at Standard Speed | Vehicle Weight (lbs) | Max Potential Speed |
| 25% | 2,500 | 400% |
| 50% | 5,000 | 200% |
| 75% | 7,500 | 133% |
| 100% | 10,000 | 100% |

Figure 8B:
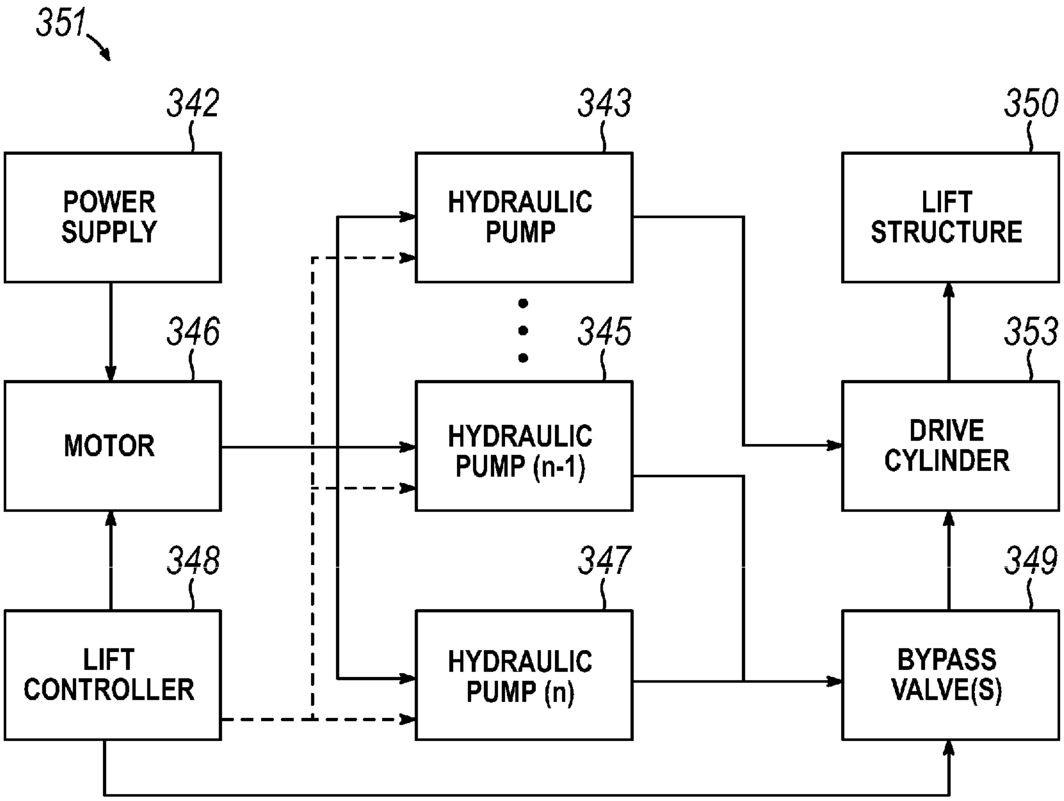
FIG. 8B is a schematic diagram of an alternative exemplary arrangement of control components, including a set of hydraulic pumps, usable to vary lift speed.

As another example of a variation on the control components, FIG. 8B shows a schematic diagram of an alternative exemplary arrangement of control components (351). The control components (351) of FIG. 8B share several features with the control components (341) of FIG. 8A, including the motor (346), the lift structure (350), the power supply (342), the lift controller (348), and the hydraulic pump (343). The control components (351) may also include one or more additional hydraulic pumps, or hydraulic pump sections, such as the hydraulic pump (n−1) (345) and the hydraulic pump (n) (347). The hydraulic pump (343) is coupled directly to a drive cylinder (353) that raises and lowers the lift structure (350). The remaining pumps (345, 347) are coupled to the drive cylinder (353) through a set of bypass valves (349) that are configured to be selectively opened and closed based upon control signals from the lift controller (348).

During operation of the control components (351), the motor (346) operates each of the hydraulic pumps (343, 345, 347) to raise the lift structure (350). During such operation, the hydraulic pump (343) will apply a first level of hydraulic flow to the drive cylinder (343) that may correspond to a default lift speed (e.g., the standard speed (206)). Each other hydraulic pump (345, 347) is capable of applying additional flow to the drive cylinder (353) depending upon the configuration of the bypass valves (349).

For example, the lift controller (348) may open each of the bypass valves (349) so that the additive flow from the hydraulic pumps (345, 347) is released (e.g., by routing the pressurized fluid back to a reservoir tank) rather than applying to the drive cylinder (353). This does not apply any additional flow to the drive cylinder (353), but it does maintain or reduce the load placed on the motor (346). Similarly, the lift controller (348) may adjust the bypass valves (349) such that one or both of the hydraulic pumps (345, 347) apply flow to the drive cylinder (353), increasing the load placed on the motor (346) but also increasing the speed at which the lift structure (350) is raised.

In the above configuration, it can be seen that the lift controller (348) is able to drive the drive cylinder (353) with a varying level of hydraulic flow and, depending upon a lifted load, corresponding speed. Varying lift characteristics may be achieved by varying the control signals provided to the motor (346), the bypass valves (349), or both in order to support a wide range of performance. As an example, this may include operating the lift with each of the bypass valves (349) open (e.g., with only the hydraulic pump (343) lifting)

to raise (206) the lift at a standard speed and measuring load on the motor (346) to determine (208) the potential speed, as has been described. The lift controller (348) may then cause the lift to raise (210) at the variable speed by adjusting the operation of the motor (346), closing one or more of the bypass valves (349), or both. These adjustments may be made incrementally as part of a feedback loop until the potential speed (208) (e.g., or a maximum safe speed based on the measured load) is reached. Additionally, the performance characteristics of each of the pumps (343, 345, 347) or pump sections may be varied to provide further variability (e.g., one pump or pump section may be capable of providing a force x while a second pump or pump section may be capable of providing a force 1/x, such that one pump is appropriate for greatly increasing lift speed and motor load, while the second pump is appropriate for fine control of the lift speed and motor load).

Figure 13:
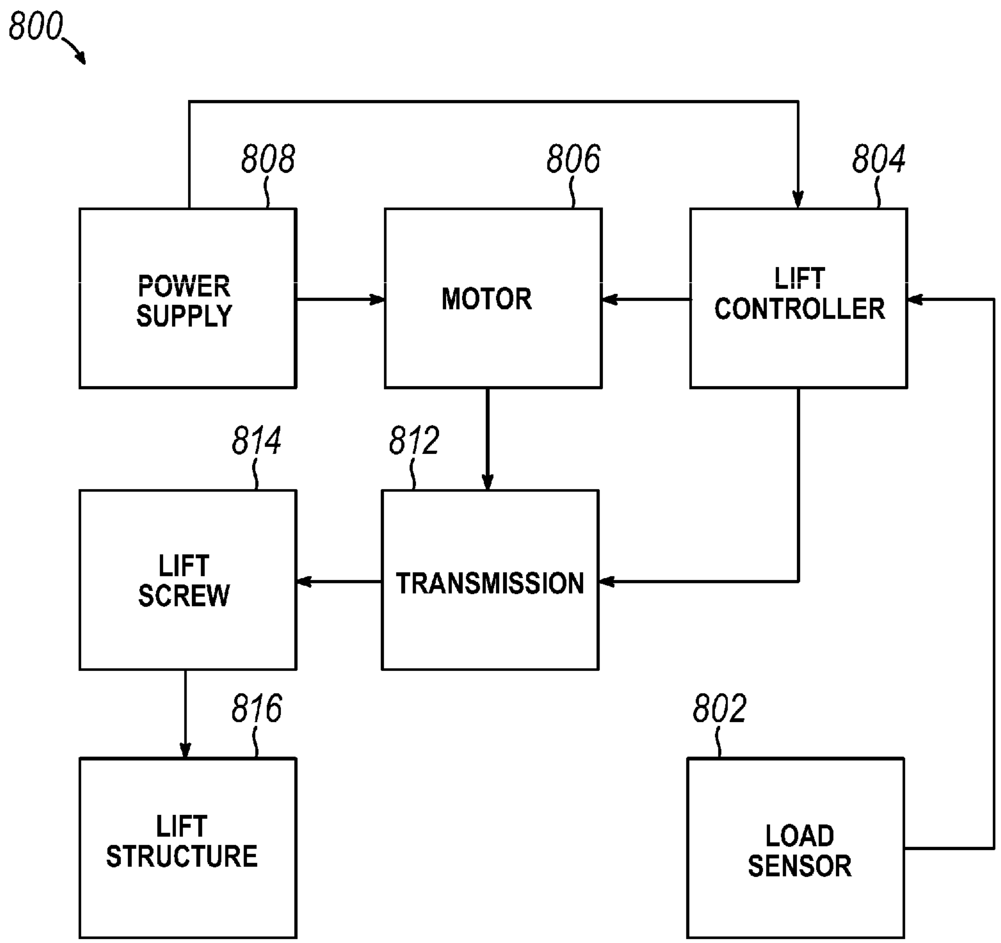
FIG. 13 is a schematic diagram of an alternative exemplary arrangement of control components including a transmission and lift screw.

As another example of a variation on the control components, FIG. 13 shows a schematic diagram of an alternative exemplary arrangement of control components (800). The control components (800) include several features similar to those already described, such as a lift controller (804), a motor (806), a power supply (808), and a lift structure (816). A load sensor (802) may be implemented in varying ways and may include any of the components or systems disclosed herein that are capable of measuring performance or generating data that is usable to determine (208) the potential speed at which the lift may operate, and may include, for example, one or more of the variable frequency drive (304), motor sensor (309), current sensor (313), weight sensor (323), or other sensors or tools. Regardless of form, the load sensor (802) may be configured to produce and communicate data, as one or more signals, indicating the current electrical load (e.g., power draw) on the motor (806) or another performance metric of the lift (e.g., electrical draw from the power supply (808)), and communicate with the lift controller (804) in order to determine (208) potential speeds.

The control components (800) also include a transmission (812) coupled to a lift screw (814), which itself is coupled to the lift structure (816) and operable to raise and lower the lift structure (816) (e.g., such as a ball-screw lift). The transmission (812) is capable of transferring power from the motor (806) to the lift screw (814) and may include a set of gears or a continuously variable gear that allow for transfer of power from the motor (806) at varying gear ratios, in varying rotational directions (e.g., a raise direction and a lower direction), or both. The lift controller (804) may be configured to operate the motor (806) and the transmission (812) in order to vary the motor operational characteristics, the gear ratio, or both in order to achieve varying lift speeds depending upon feedback from the load sensor (802). The control components (800) may also include a variable frequency drive (e.g., such as the variable frequency drive (304)), or the lift controller (804) may be configured to support PWM control of the motor (806), or both in order to provide further variable control of the lift screw (814) rotation speed. In this manner, the lift controller (804) may determine (208) potential lift speeds based upon feedback from the load sensor (802), and then vary the operation of the motor (806), change the gear ratio of the transmission (812), or both in order to cause the lift screw (814) to rotate at the corresponding speed to cause the lift to raise (210) at the variable speed.

Figure 9:
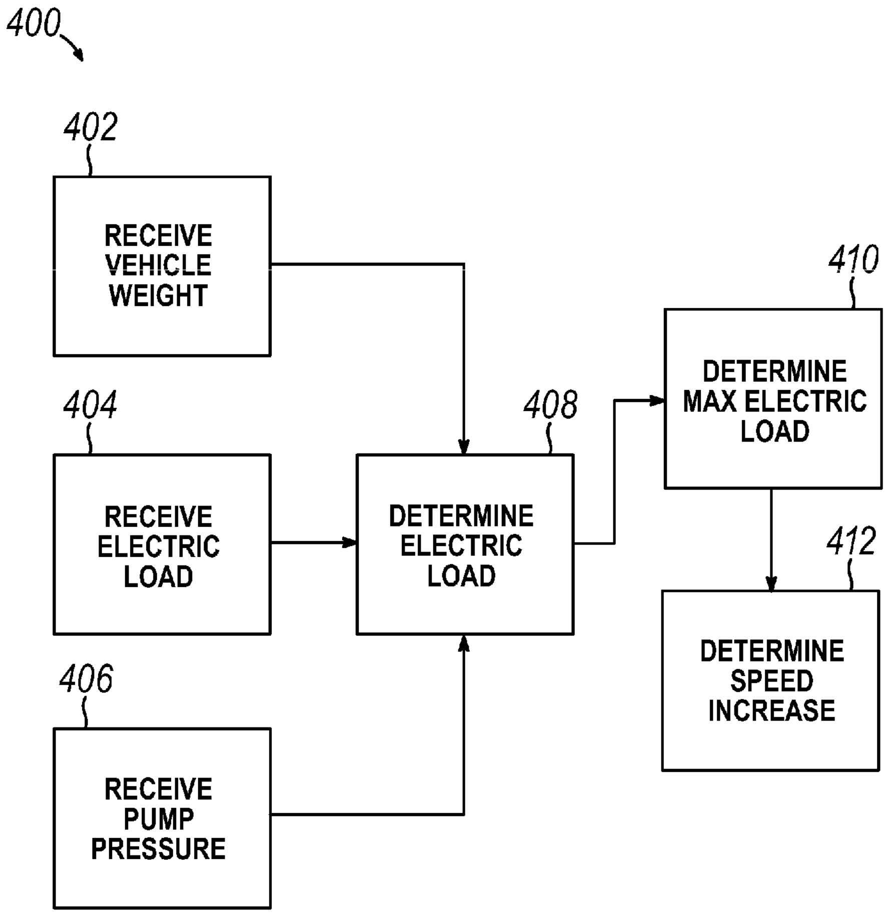
FIG. 9 is a flowchart of an exemplary set of steps that may be performed in order to determine a variable lift speed.

As can be seen from the above examples, information provided from different components may be used by itself or in combination with other information to determine (208) the potential raise speed. As an example, abstracted from a particular implementation of control components, FIG. 9 shows a flowchart of an exemplary set of steps (400) that may be performed in order to determine (208) a potential raise speed. Such steps may be performed by one or more of the lift controller (108), the variable frequency drive (110), the motor (112), or other devices having the capability to receive and process information. Initially, the device may receive information from one or more sources, which may include receiving (402) information indicating a supported vehicle's weight (e.g., information produced by the weight sensor (323)), receiving (404) information indicating the magnitude of an electrical load drawn while lifting a vehicle (e.g., information produced by the variable frequency drive (304), the current sensor (313), or the variable frequency drive (334)), or receiving information indicating a hydraulic pressure produced while lifting a vehicle (e.g., information produced by the hydraulic pump (343) or a sensor connected to the hydraulic system). Received (402, 404, 406) information may be in the form of electrical signals of varying characteristics indicating raw measurements of a sensor, may be in the form of integers or binary-encoded data, or may take other appropriate forms. Weight information may be received from sensors located on the lift, a remote sensor such as tire weight scales, a database of vehicle information, or other sources will occur to those skilled in the art in view of this disclosure.

With one or more types of information available, the system may then determine (408) an electrical load on the motor (112) during operation with the current vehicle. It will be apparent that determining (408) the electric load is one of several different ways to normalize these different data sets, and that other approaches may be suitable (e.g., normalizing a received (404) electric load to vehicle weight, rather than normalizing a received (402) vehicle weight to electric load). Regardless of the specific transformations of data, one goal is to provide a reference point between the received (402, 404, 406) data and the maximum potential electrical load at which the motor (112) is operable.

In the shown steps (400), this may include receiving (402) a vehicle weight and then determining (408) an electrical load associated with lifting that vehicle by use of a query or comparison with a database or dataset such as that shown in Table 1. This may also include receiving (404) a signal indicating an electrical load and determining (408) the electric load based thereon, which may require little or no conversion or manipulation (e.g., electric load may be rounded upward or downward, converted from a raw signal to an integer, or otherwise conditioned to be usable). Steps (400) may also include receiving (406) a pump pressure and determining (408) an electrical load associated with lifting a vehicle at that pressure by use of a query or comparison with a database or dataset such as that shown in Table 2. This may also include two or more sets of received (402, 404, 406) data being used in combination to determine (408) the electric load, such as where a vehicle weight and an electrical draw may be used in combination to determine (408) the electric load, which may provide some advantages as will be described below. Other variations exist, for example, determining (408) electrical load may also be performed using various conversion equations (e.g., a function mapping weight or pressure to a corresponding electrical load).

Having determined (408) the electric load or otherwise having normalized the received data, the device may then determine (410) a max electric load that the motor (112) or other control components are capable of supporting. This value may be configured and stored on the motor (112), the lift controller (108), or another device, or may be determined based upon the attached power supply, or may be determined through incremental speed increases using a feedback loop until a static safety feature of the motor (112) or another device prevents further increases. Once the maximum performance is determined (410), the device may then determine (412) a raise speed increase that the motor (112) is capable of. As has been described, this determination (412) may be made one or more times and used to immediately or incrementally raise (210) the vehicle at a new variable speed. Determination (412) of the speed increase may be performed by, for example, comparing the current electric load to a maximum electric load, by querying or comparing to a dataset or correlation table such as that shown in Table 1 or Table 2, by using a conversion equation (e.g., a function that converts an electric load at the standard speed to a target maximum speed or a potential speed increase), or other methods.

Figure 10:
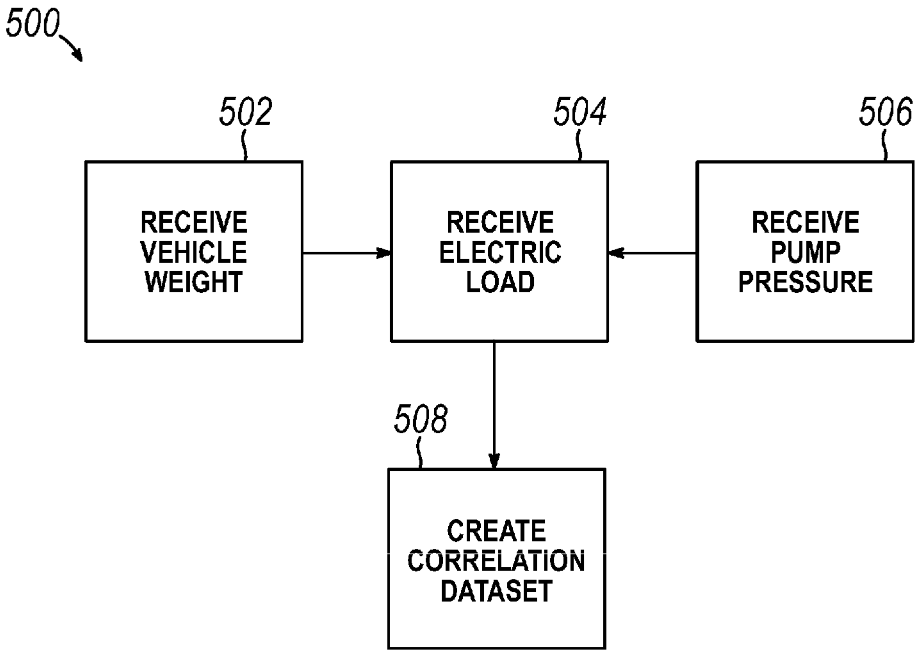
FIG. 10 is a flowchart of an exemplary set of steps that may be performed in order to build a variable lift speed dataset.

Some advantages of providing a set of control components receiving multiple sources of information (e.g., either from permanently installed or integrated components and sensors, or from temporarily installed or integrated components and sensors such as where the current sensor (313) is temporarily added to the control components (321)) that can be used to determine (412) the speed increase are redundancy of components, malfunction detection, and data correlation. As an example, FIG. 10 shows a flowchart of an exemplary set of steps (500) that may be performed to build a variable lift speed dataset such as that shown in Table 1 or Table 2, or a similar dataset. Where a device of the control components receives (504) an electrical load, and then receives (502) vehicle weight or receives (506) pump pressure, or both, the device may store and correlate such data in order to create (508) a correlation dataset.

For example, where the weight sensor (323) produces data indicating a 3000-pound vehicle is being lifted during a time segment, and the current sensor (313) indicates a draw of 10 amps during the same time segment, such information can be used to associate the 10-amp draw with a 3000-pound vehicle. Multiple such data points may be collected or extrapolated from each other (e.g., it may be estimated that a vehicle weighing 2000 pounds may draw about 6.6 amps at a standard raise speed) and then used to determine (412) a potential speed increase. In implementations where the current sensor (313) is added to the control components temporarily, it may then be removed after a usable correlation table is built. While FIG. 10 shows an exemplary set of steps that may be performed to automatically build a correlation table or similar dataset, it should be understood that such a dataset may also be built and configured manually based upon testing, simulations, or other considerations.

Figure 11:
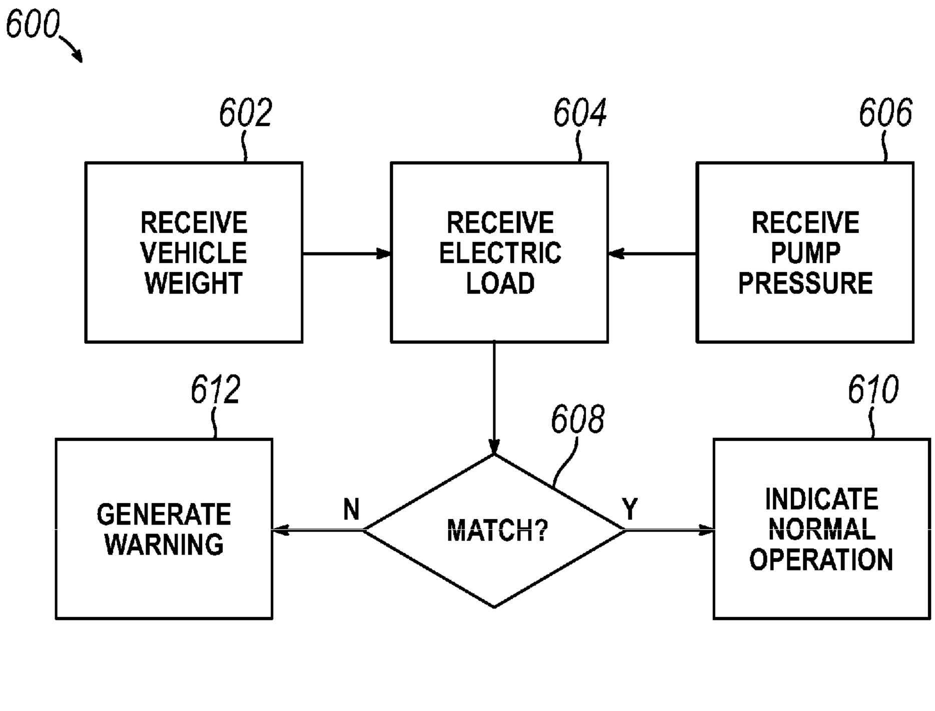
FIG. 11 is a flowchart of an exemplary set of steps that may be performed in order to identify malfunctions of the lift of FIG. 1.

As an example of malfunction detection, FIG. 11 shows a flowchart of an exemplary set of steps (600) that may be performed in order to identify the presence of a malfunctioning component. Where a device of the control components receives (604) an electrical load, and then receives (602) vehicle weight or receives (606) pump pressure, or both, the device may compare such data to historic datasets (e.g., a correlation table or conversion function) or global datasets (e.g., a global correlation table that may be associated with the performance of multiple similar lifts in new condition) and determine (608) whether the performance of one or more of the components matches (608) historic performance.

Where the current performance of the components does match (608) past performance, the device may provide an indication (610) of normal operation, which may include, for example, a positive status indicator or lack of alarm, an update to stored records or information (e.g., updating the correlation table or historic performance data to reflect normal performance on that day and time), or other similar indications. As an example, if a particular vehicle lift was used when brand new and produced data indicating an electrical draw of 10 amps (e.g., produced by the current sensor (313)) while lifting a vehicle whose weight was determined (e.g., based upon information produced by the weight sensor (323)) to be 3000 pounds, later uses of that vehicle that produce similar results may indicate that the operation of the control components has not substantially changed since installation.

Where the current performance of the components does not match (608) past performance data or global performance data, the device may generate (612) a warning indicating a change in performance relative to past performance data or global performance data. The performance information may not match (608) due to various reasons, including failure or miscalibration of a sensor (e.g., where the current sensor (313) may start to report inaccurate electrical loads, or the weight sensor (323) begins to report inaccurate vehicle weights), degrading performance of the motor (112) or variable frequency drive (110) (e.g., where the motor (112) begins to require greater electrical loads, relative to new condition, due to age, use, lack of maintenance, temperature, or other factors), degrading performance of the hydraulic pump (343) (e.g., where the hydraulic pump (343) is unable to maintain or build pressures as in new condition), and other reasons. Continuing the above example, if historic data or global specifications indicate that a brand-new lift will draw 10 amps while raising a 3000-pound vehicle at a standard speed, and presently received information indicates that the lift is drawing 12 amps while raising a 3000-pound vehicle at the standard speed, it may indicate that the motor (112) needs to be serviced, or that the current sensor (313) is failing.

The generated (612) warning may include, for example, a visual or audible warning, a text warning, an electronic communication transmitted to another device over a network, and other variations as will be apparent to one of ordinary skill in the art in light of the disclosure herein. A generated (612) warning may be useful in indicating a change in one or more components of the system that have impacted the performance of the system. The particular source of the malfunction or performance change may not be immediately known, but such a warning may still be advantageous in indicating a need for inspection or maintenance of the system. As another example, for a set of control components including the variable frequency drive (110), the current sensor (313), and the weight sensor (323), a change in performance may be more immediately pinpointed due to the redundancy of electrical load reporting.

Other features and variations of the steps of FIG. 11 exist. As an example, while tracking use and performance of lift components as part of comparing (608) to historical data, a lift controller or other computing device may additionally track and store a lift usage dataset that may include, for example, lift cycles, lift operation time, lift load over time, and other usage characteristics, and may be further configured to provide various maintenance notices based thereon. This may include tracking and correlate motor operation to a real-time clock in order to produce a timeline of use. As an example, the system may be configured to determine estimated wear and/or remaining life of high-wear items such as equalizer cables, and it may generate warnings (612) to provide or enforce a maintenance schedule for such items based upon usage rather than detected (608) changes in performance. Other preventative maintenance and inspection tasks may also be communicated via generated (612) warnings and may include, for example, maintenance, replacement, or inspection tasks related to vehicle adapters, grease points, torque anchor bolts, and hydraulic fluid.

Determining and generating (612) warnings relating to maintenance, inspection, and replacement may be particularly advantageous when implemented with control components such as those shown in FIG. 5A, which may use the current sensor (313) to determine the load on the motor (316) and, correspondingly, the weight of a vehicle being lifted. While such a system may be configured to generate (612) warnings based on direct tracking of usage (e.g., number of raise and lower cycles, total operation time), it may also be configured to generate (612) warnings based on determined or composite usage indicators. As an example, this may include accelerating a maintenance schedule for one or more components of a lift by a configured amount for each lift cycle for a vehicle exceeding a configured weight (e.g., a lift cycle for a vehicle exceeding 10,000 pounds may be factored against the usage history as 1.8 lift cycles, while normal lift cycles may be valued at 1.0 lift cycles). As another example, this may include separately tracking such usage such that particular maintenance tasks are indicated for every 15 lift cycles meeting such criteria (e.g., inspect hydraulic seals after every 15 lift cycles that include a 10,000-pound or greater vehicle), or for every 250,000 pounds lifted during such lift cycles (e.g., inspect hydraulic seals after every set of lift cycles for vehicles 10,000 pounds or greater once the aggregate set weight reaches 250,000 pounds).

As an addition or alternative to tracking and influencing usage based upon a determined weight of a lifted vehicle, usage may be tracked, and warnings generated (612) based on load measured by the current sensor (313). As an example, where a detected electrical load on the motor (316) exceeds a configured threshold (e.g., a threshold indicating normal use, such as the standard load on the motor (316) while lifting a 5,000-pound vehicle at the standard speed (206), whereas use exceeding such thresholds may indicate use of optimized or dynamic lift speed features, or extremely heavy vehicle lifts), related usage may be tracked at an increased ratio in order to accelerate a maintenance schedule (e.g., operation time below the threshold may be recorded as 1.0 second per second, while operation above the threshold may be recorded as 1.8 second per second) or may be separately tracked and associated with particular maintenance tasks as has been described (e.g., for every 50 lift cycles where the load threshold is exceeded, inspect equalizer cables).

As another example, a lift controller or other computing device may track motor performance (e.g., speed, cycle time) and create a historic dataset that describes the minimum and maximum heights to which the lift structure has been raised or lowered. Such information may advantageously be used to suggest characteristics of the location at which the lift is installed (e.g., ceiling height), or may be used to determine that a different lift may be more appropriate for that location and application.

As another example, the lift controller or another computing device may be configured to receive temperature data from a temperature sensor that is positioned on or near the lift controller itself, a motor, a variable frequency drive, or other components of the lift system. Temperature information may be saved and correlated with motor usage and other detectable lift conditions to produce a timeline of thermal effects based on lift operation. Such a dataset may be advantageously used to identify the causes of thermal effects and/or correlated to performance of the motor or other components of the system.

As another example, the lift controller or another computing device may be configured to integrate with a shop management system for a facility at which the lift is in use. This may allow individual vehicle lifts to report to a central system when they are in use or available based upon operation of the motor or information from weight sensors on the lift structure, or it may allow the lift controller to generate (612) a warning if the weight of a currently lifted vehicle does not match an anticipated weight for a vehicle assigned to that lift.

Figure 14:
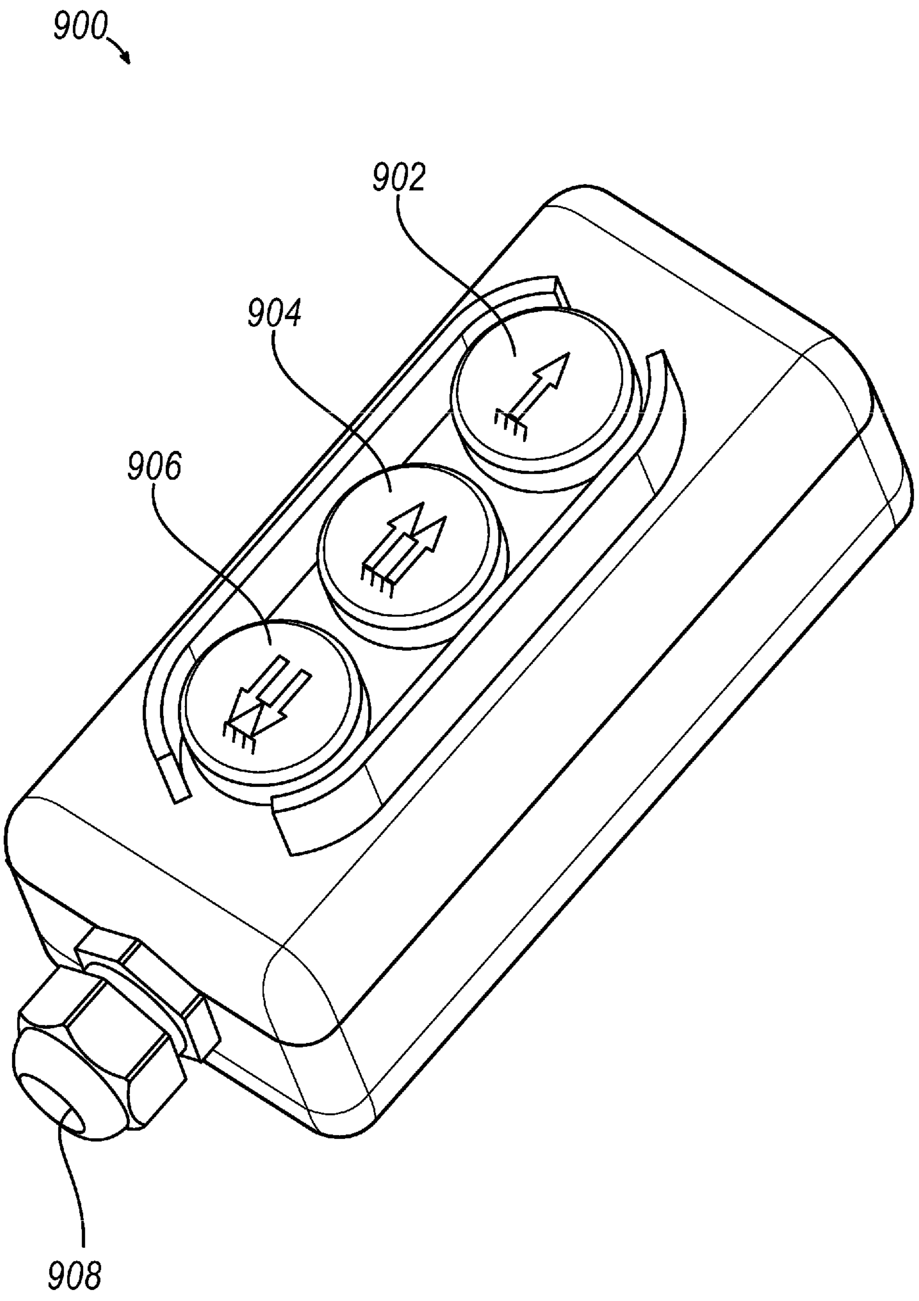
FIG. 14 is a perspective view of an exemplary pendant control usable with several of the disclosed lift systems.

FIG. 14 shows a perspective view of an exemplary pendant control (900) that may be configured for any the disclosed control components usable with the steps of FIG. 3. The pendant control (900) may be in communication with a lift controller (e.g., the lift controller (308)) and provides a human-machine interface that allows a user to provide control signals that influence the operation of the lift controller. The pendant control (900) includes a first button (902) that, when pressed, communicates with the lift controller to raise the lift structure at a first speed. The first speed may be, for example, the standard speed (206) or a predetermined fraction of the standard speed (e.g., 50% of standard speed, 25% of standard speed, and so on). The first button (902) may provide a substantially static raise speed when pressed and may be advantageous for fine adjustments of the lift structure such as may be required when a user is visually spotting to ensure engagement (204) of the lift with a vehicle.

A second button (904) may be configured to, when pressed, raise the lift structure at a dynamic variable speed that is determined using steps such as those shown in FIG. 3. This may allow a user to raise the lift structure at an optimized speed that is determined and achieved using an incremental or continuous feedback loop, as has been described herein. As an example, an intermittent feedback loop may be configured to determine (208) and adjust (210) to a subsequent variable speed once per second, while a continuous feedback loop may be configured to determine (208) and adjust (210) to a subsequent variable speed as quickly as the processing components, sensors, and signal connections allow. Either method of optimizing raise speed may be alternately or additionally limited by a maximum acceleration step per cycle or per second, such that the increase from the standard (206) raise speed to the variable (210) raise speed may occur over a period of time that allows for steady acceleration that will not startle users or unsettle a raised vehicle or other load.

A third button (906) may be configured to, when pressed, lower the lift structure at a static speed, or a variable speed that may be influenced by gravity or the particular mechanism of the vehicle lift. As an example, the third button (906) may cause a pressurized hydraulic member to release fluid under the force of gravity or cause a lift screw to rotate in a lowering direction under the force of gravity.

The pendant control (900) also includes a port (908) that allows for a wired physical connection to a lift controller, variable frequency drive, motor, or other component. In some implementations, the pendant control (900) may instead connect wirelessly (e.g., via WI-FI, BLUETOOTH, or other wireless communication). In some implementations, the pendant control (900) may include a dial or joystick that is usable to operate the lift at a standard speed or a ratio of the standard speed, or at a dynamic optimized speed, instead of or in addition to the buttons (902, 904, 906). In some implementations, the pendant control (900) may include a light emitting diode or other display that may be a touch screen and may provide a software user interface that allows for the lift to be raised at static or dynamic speeds by interacting with virtual buttons. In some implementations, the software user interface may be configured on or accessed via a device other than the pendant control (900), such as a smartphone, tablet, or proprietary computing device. In some implementations, a lift system may include multiple pendant controls (900) or other controls disposed about the lift area, such that a user may be able to control the lift from either side of a vehicle.

Other features and variations of the disclosed systems and control component exist. For example, in some implementations a variable frequency drive may be configured to operate a motor in forward or reverse, which may allow for speed optimization of vehicle lowering as opposed to relying upon gravity or mechanical limitations of the structure. Such implementations may be implemented as bi-directional hydraulic pump systems that are capable of operating the hydraulic pump in reverse in order to lower the lift structure at a desired speed instead of relying upon gravity and/or fluid dynamics to control the lowering speed.

In such implementations, the variable frequency drive may be configured to operate the motor in reverse at the desired output in order to provide a controlled lowering speed and prevent sudden or uncontrolled lowering. In this manner, the variable frequency drive may meter the rate of fluid returning to the reservoir and determine the current lowering speed based thereon, and it may prevent the lowering speed from exceeding a configured speed (e.g., which may be determined arbitrarily or may be determined based upon law or regulation). A determination of lowering speed based upon fluid metering may also be used to determine and provide an optimized lowering speed (e.g., based upon the release of fluid from the system, the weight of the load, etc.) that may be gradually reached and maintained using steps similar to those of FIG. 3, while also being limited within a configured speed limit. A system such as that described above advantageously allows for controlled and optimized raising and lowering speeds.

In some implementations, the lowering speed of the system may be controlled and optimized with the use of regenerative components that are capable of converting force or heat into electrical charge for storage in an attached battery. The attached battery may be configured to expend charge while raising a vehicle (e.g., by providing charge to a motor), and then be at least partially recharged while lowering the vehicle. The charge rate for a battery when lowering a vehicle may also be measured and used with information such as the vehicle's weight to determine a current lowering speed of the vehicle, which may be used when controlling or optimizing lowering speed, as has been described.

As mentioned above, control components (101, 300, 301, 311, 315, 331, 341, 351, 800) of a lift (10) may be used to actuate lift structures (102, 106) relative to a respective lift post (100, 104) in order to lift a vehicle at variable speeds corresponding to the specific load of a vehicle. Control components (101, 300, 301, 311, 315, 331, 341, 351, 800) may include various features that need to be easily accessible by an operator during exemplary use of lift (10) (e.g., lift controller (108), pendant control (900), lift controller (804), etc.). Such features (e.g., lift controller (108), pendant control (900), lift controller (804), etc.) may be called user-interface control components.

Conversely, control components (101, 300, 301, 311, 315, 331, 341, 351, 800) may include various features that do not require an operator to interface with such features during exemplary use of lift (10) (e.g., variable frequency drive (110), motor (112), power supply (302), etc.). In other words, such features (e.g., variable frequency drive (110), motor (112), power supply (302), etc.) do not need to be accessible by an operator during exemplary use of lift (10). Features that do not need to be easily accessible by an operator during exemplary use of lift (10) may be referred to as non-user-interface control components.

In some instances, as shown in FIG. 1, non-user-interface control components (e.g., variable frequency drive (110), motor (112), power supply (302), etc.) may be attached to the same general locality on lift posts (100, 104) as user-interface control components (e.g., lift controller (108), pendant control (900), lift controller (804), etc.). Therefore, if both user-interface control components and non-user-interface control components are located along a portion of lift posts (100, 104) that is easily accessible by an operator, non-user-interface components may unnecessarily take-up workspace that the operator may otherwise utilize around lift posts (100, 104). Therefore, it may be desirable to place non-user-interface control components along a location of lift posts (100, 104) that does not take-up workspace for the operator.

As also mentioned above, during exemplary use of lift (10), lift structures (102, 106) may have to be manually adjusted such that initial elevation of lift structures (102, 106) contacts or nearly contacts respective vehicle lift points, thereby allowing further elevation of lift structures (102, 106) to raise a vehicle into a lifted position relative to the floor. In many instances, more than one technician is used to manually adjust lift structures (102, 106) into suitable alignment with vehicle lift points. For example, one technician may align lift structure (102) with associated vehicle lift points, while a second technician may align lift structure (106) with associated vehicle lift points.

In instances where only one technician controls a user-interface control component (e.g., controller (108) or pendant control (900)), that technician may need to confirm that both lift structures (102, 106) are suitably aligned with associated vehicle lift points prior to lifting structures (102, 106) to engage vehicle lift points. This may take up an undesirable amount of time, leading to less efficient use of a lifting bay. Therefore, it may be desirable to have a user-interface control component associated with each lift post (100, 104), where each user-interface control component requires same input to be simultaneously pressed on both sides of lift (10) before lift motion of lift structures (102, 106) is started. Therefore, rather than having an individual technician confirm both lifting structures (102, 106) are suitably aligned, one technician for each lift post (100, 104) may confirm alignment of their respective lift structure (102, 106), and then press the desired input to indicate their intention to actuate lift structures (102, 106). Once the same input on each user-interface control component is pressed simultaneously, lift structures (102, 106) may then move relative to lift posts (100, 104).

Figure 15:
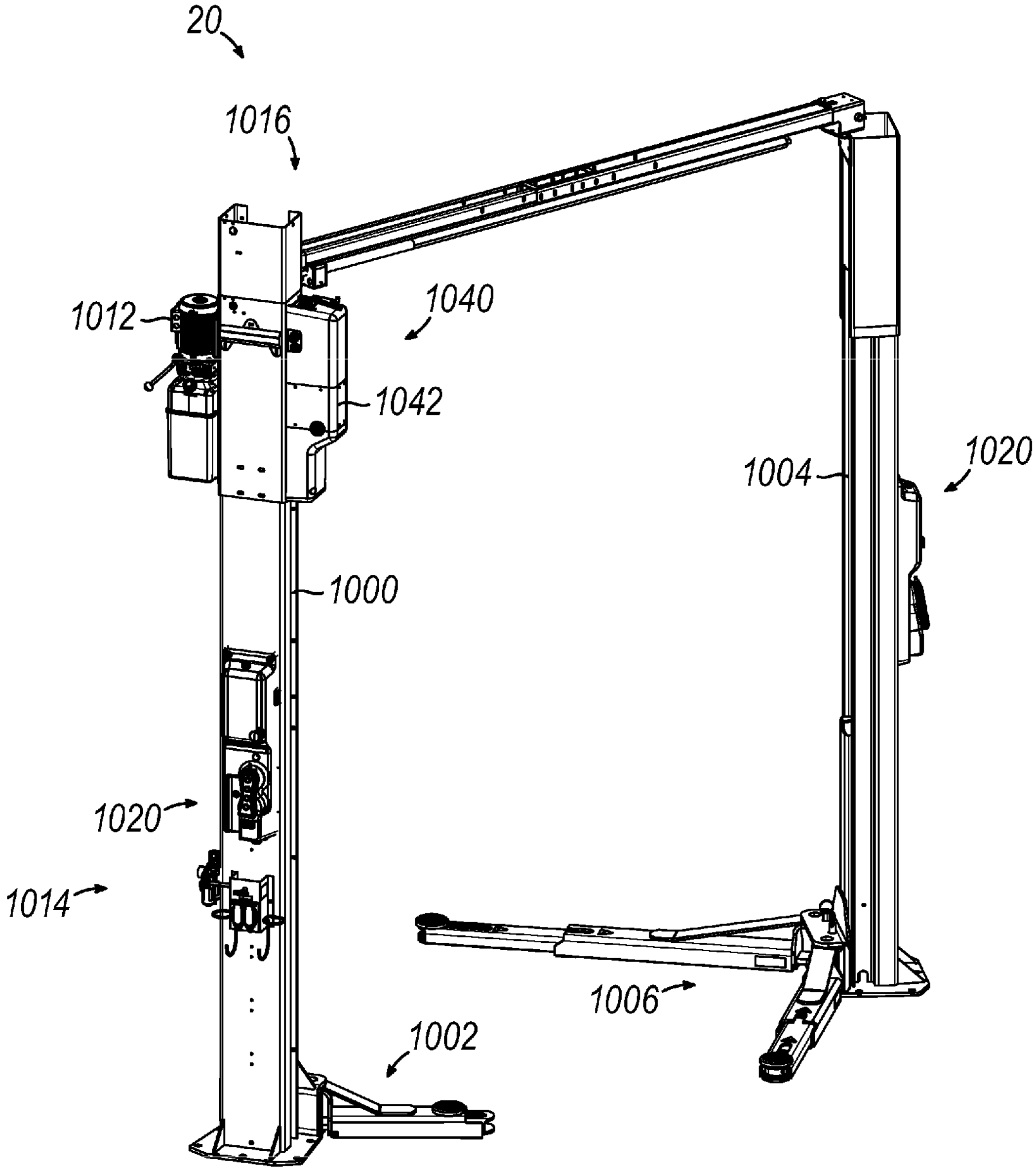
FIG. 15 is a perspective view of another exemplary lift.

FIG. 15 shows an exemplary lift (20) that may be substantially similar to lift (10) described above, with differences elaborated below. Therefore, lift (20) includes a pair of lift posts (1000, 1004), each having a respective lift structure (1002, 1006), and which may be substantially similar to lift posts (1000, 1004) and lift structures (102, 104) described above. Additionally, suitable components of lift (20) described herein may include any of the features of control components (101, 300, 301, 311, 315, 331, 341, 351, 800) as would be apparent to one skilled in the art in view of the teachings herein. Unlike lift (10) described above, lift (20) includes a pair of user-interface control assemblies (1020) associated with a lower portion (1014) of each respective lift post (1000, 1004) and a non-user-interface control assembly (1040) associated with an upper portion (1016) of lift post (1000). As will be described in greater detail below, non-user-interface control assembly (1040) includes various components that do not require direct interaction by a technician in order to operate lift (20) in accordance with the description herein. Therefore, the placement of non-user-interface control assembly (1040) along an upper portion (1016) of lift post (1000) may create more working space for a technician near lower portion (1014) of lift post (1000). Additionally, as will be described in greater detail below, non-user-interface control assembly (1040) includes a variable frequency drive (1046) allowing a motor (1012) to actuate lift structures (1002, 1006) at variable speeds depending on the load of the vehicle.

Figure 16:
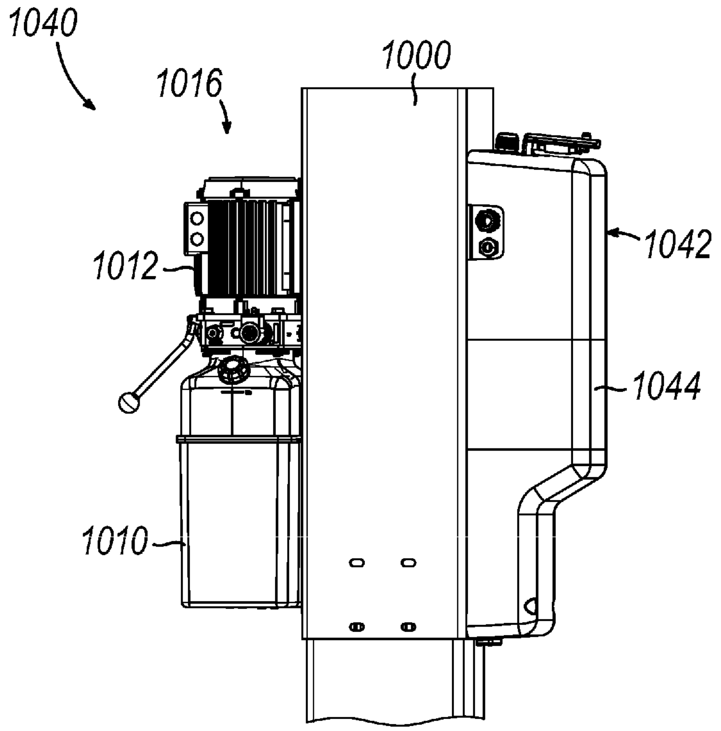
FIG. 16 is an elevational side view of a non-user-interface control assembly of the lift of FIG. 15.

As best shown in FIG. 16, non-user-interface control assembly (1040) includes motor (1012) in fluid communication with a hydraulic reservoir (1010), and an upper housing (1042) having a casing (1044) protecting various components stored within upper housing (1042). While all components of non-user-interface control assembly (1040) are associated with lift post (1000), any suitable components of non-user-interface control assembly (1040) may be associated with lift post (1004). Therefore, in some instances, non-user-interface control assembly (1040) may have components associated with each lift post (1000, 1004), or just components associated with lift post (1004).

Motor (1012) is substantially similar to motor (112) described above. Therefore motor (1012) is configured to drive actuation of lift structures (1002, 1006) in order to lift and lower a vehicle relative to the shop floor. Motor (1012) may utilize hydraulic fluid (1015) (see FIG. 21) in order to actuate lift structures (1002, 1006) in accordance with the description herein. Like the rest of non-user-interface control assembly (1040), motor (1012) and hydraulic reservoir (1010) are associated with upper portion (1016) of lift post (1000), thereby saving working space at the lower portion (1014) of lift post (1000). As such, a technician may move around lift post (1000) without having to worry about damaging components of non-user-interface control assembly (1040).

Figure 17:
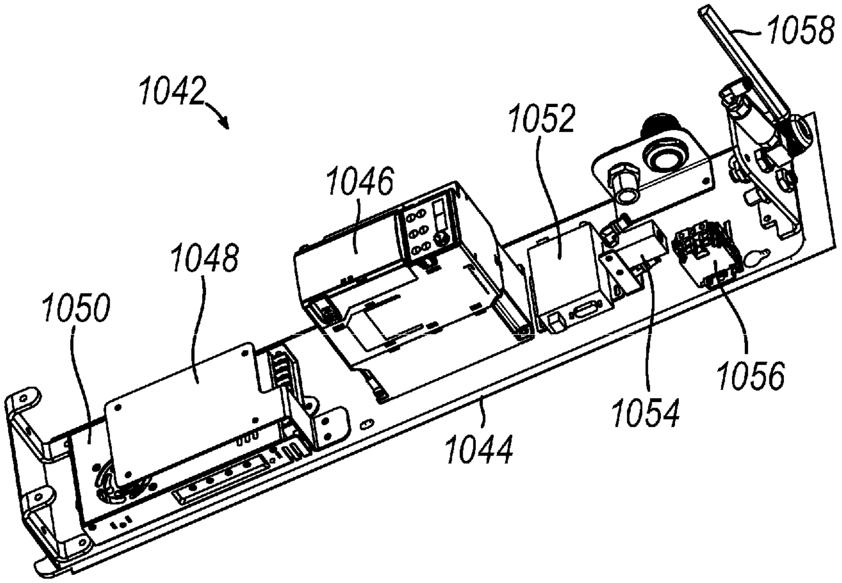
FIG. 17 is a perspective view of an upper housing of the non-user-interface control assembly of FIG. 16, with selected portions omitted for purposes of clarity.

As mentioned above, upper housing (1042) has casing (1044), which protects various components stored within upper housing (1042). Upper housing (1042) may include any suitable features as would be apparent to one skilled in the art in view of the teachings herein. In the current example, as best shown in FIG. 17, the interior of upper housing (1042) includes a variable frequency drive (1046), a circuit board (1048), a power supply (1050), an internet of things (JOT) module (1052), a wiring terminal (1054), an electric drive air relay (1056), and an antenna (1058).

Variable frequency drive (1046) may be substantially similar to variable frequency drive (304) described above, except that variable frequency drive (1046) of the current example is associated with upper portion (1016) of lift (20). Therefore, variable frequency drive (1046) is in communication with motor (1012) and may instruct motor (1012) to actuate lift structure (1002, 1006) at various speeds in accordance with the description herein. With the placement of variable frequency drive (1046), a technician may move around lift post (1000) without having to worry about damaging such components. Variable frequency drive (1046) may provide variable lift performance (e.g., such as the variable speed (210)) as would be apparent to one skilled in the art in view of the teachings herein. Variable frequency drive (1046) may include any suitable features described above in order to achieve variable lift performance. Variable frequency drive (1046) may include the features of lift controller (108) and may include any of the features of control components (101, 300, 301, 311, 315, 331, 341, 351, 800) as would be apparent to one skilled in the art in view of the teachings herein.

Figure 21:
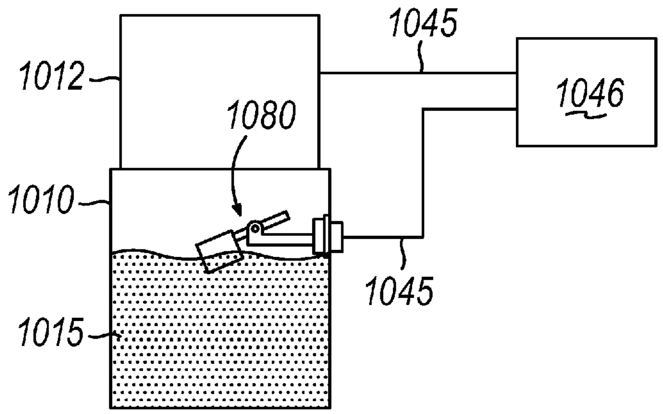
FIG. 21 is a schematic diagram of the non-user-interface control assembly of FIG. 16.

Since motor (1012) is raised on lift post (1000) at the upper portion (1016) it may be difficult for a technician to monitor the hydraulic fluid levels within hydraulic fluid reservoir (1010). Therefore, as shown in FIG. 21, it may be desirable to place a float switch (1080) within reservoir to detect if a suitable amount of hydraulic fluid (1015) is housed within reservoir (1010). For example, float switch (1080) and motor (1012) may both be in communication with variable frequency drive (1046) via electrical wiring (1045). Float switch (1080) may be located at a position in reservoir (1045) associated with a minimum amount of fluid required to operate lift (20). Therefore, when lift (20) is in the completely lowered position, the amount of hydraulic fluid (1015) within reservoir (1010) may be indicative of the amount of hydraulic fluid (1015) within the lift system. If switch (1080) is floating while lift (20) is in the lowered position, this may be indicative that a sufficient amount of hydraulic fluid is in the system. If switch (1080) is not floating while lift (20) is in the lowered position, this may be indicative that an insufficient amount of hydraulic fluid is in the system. Switch (1080) may communicate this status to variable frequency drive (1046), which may then indicate to the technician whether or not hydraulic fluid needs to be added to the system. Variable frequency drive (1046) may also monitor the lift height by monitoring data provided by motor (1012). Therefore, variable frequency drive (1046) may be able to monitor whether or not switch is activated, and whether or not lift (20) is in the lowered position. Variable frequency drive (1046) may include any suitable components to achieve the mentioned functionality, including processors. Additionally, other components besides variable frequency drive (1046), as would be apparent to one skilled in the art in view of the teachings herein, may be in communication with switch (1080) and motor (1012) in order to determine whether the proper amount of hydraulic fluid is within lift (209).

Circuit board (1048) may be used to establish communication between variable frequency drive (1046) and components of user-interface control assembly (1020). Circuit board (1048) may limit the amount of energy supplied to components of user-interface control assembly (1020), which may in turn limit the component of user-interface control assembly (1020) to non-incentive power levels. Circuit board (1048) may include any suitable structures as would be apparent to one skilled in the art in view of the teachings herein.

Power supply (1050) is configured to transmit incoming power from an outside power source into low-voltage DC to provide non-hazardous power to suitable components of lift (20). Power supply (1050) may also power any suitable components of lift (20) as would be apparent to one skilled in the art in view of the teachings herein.

IOT module (1052) is in communication with variable frequency drive (1046) in order to read suitable data from variable frequency drive (1046) and transmitted such data to an outside source for remote monitoring of variable frequency drive (1046).

Wiring terminal (1054) may be configured to act as a termination point for incoming single-phase or 3-phase power and to distribute that power throughout non-user-interface control assembly 1040, the upper housing 1042, and/or other components and subsystems of lift 20.

In instances where locking mechanisms on lift posts (1000, 1004) utilize air locks, electric-driven air relay (1056) may be configured to receive a compressed air supply from the shop and route the supplied air to air cylinders that engage mechanical locks inside lift posts (1000, 1004).

Antenna (1058) is connected to IOT module (1052) and is configured to wirelessly couple IOT module (1052) to an outside source via wireless internet of the shop.

It should be understood that the above-described components of non-user-interface control assembly (1040) do not require direct interaction with a technician during exemplary use of lift (20). As such, those components may be associated with upper portion (1016) of posts (1000, 1004) in order to save working space for technicians at lower portion (1014). The above-mentioned components are merely illustrative. It should be understood that any suitable components may be incorporated into non-user-interface control assembly (1040) as would be apparent to one skilled in the art in view of the teachings herein.

Figure 19:
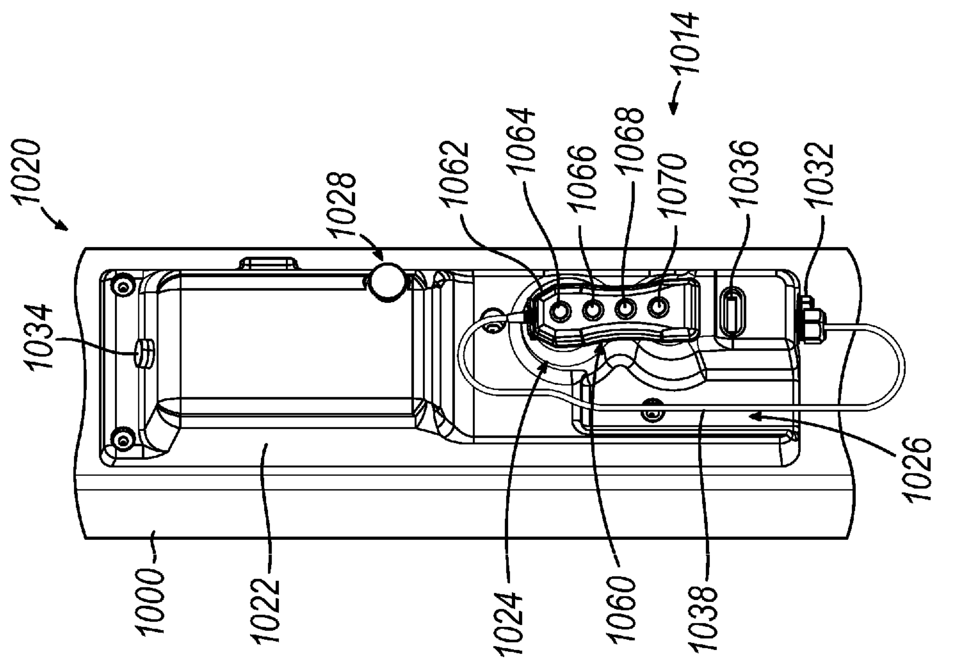
FIG. 19 is a perspective view of the user-interface control assembly of FIG. 18 attached to a lift post of the lift of FIG. 15.
Figure 18:
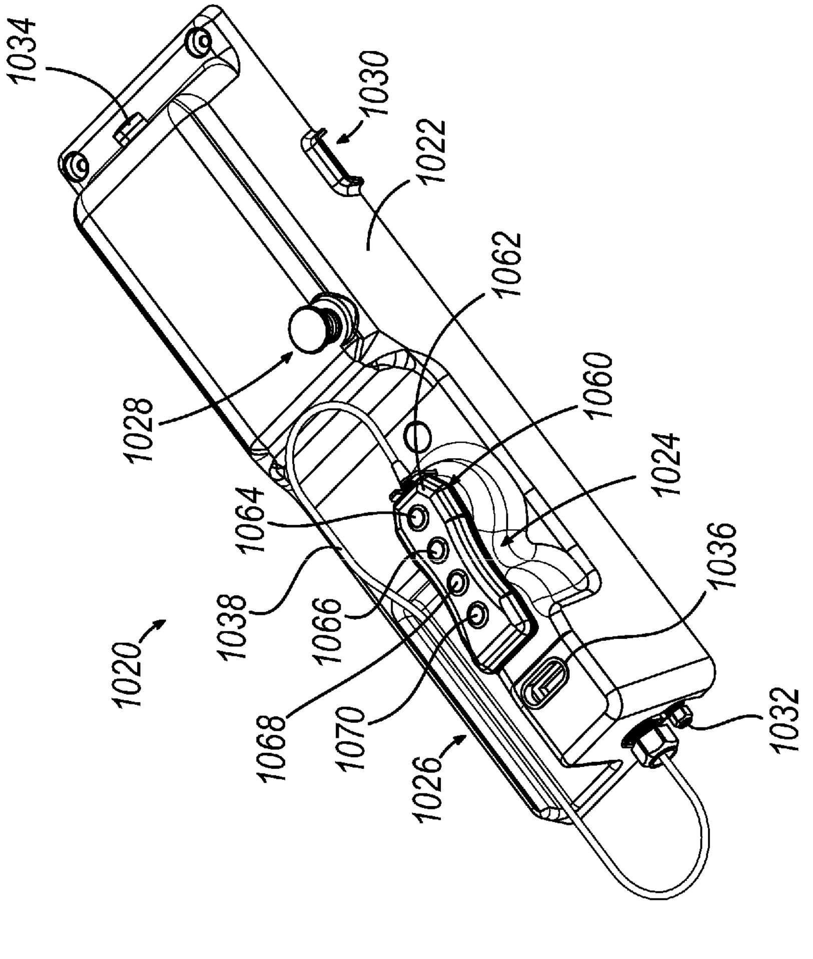
FIG. 18 is a perspective view of an exemplary user-interface control assembly of the lift of FIG. 15.

FIGS. 18-19 show user interface control assembly (1020). User interface control assembly (1020) includes components that a technician may need to interface with during exemplary use of lift (20). Therefore, as mentioned above, a user interface control assembly (1020) is located at a lower portion (1014) of each lift post (1000, 1004). In some instances, only one user-interface control assembly (1020) is used.

Each user-interface control assembly (1020) includes a casing (1022) defining a pendant recess (1024) and a cable recess (1026), an emergency stop (1028), a cable inlet (1030), an air inlet (1032), an indicator light (1034), a view screen (1036), a retractile remote cable (1038), and a pendant (1060).

Figure 20:
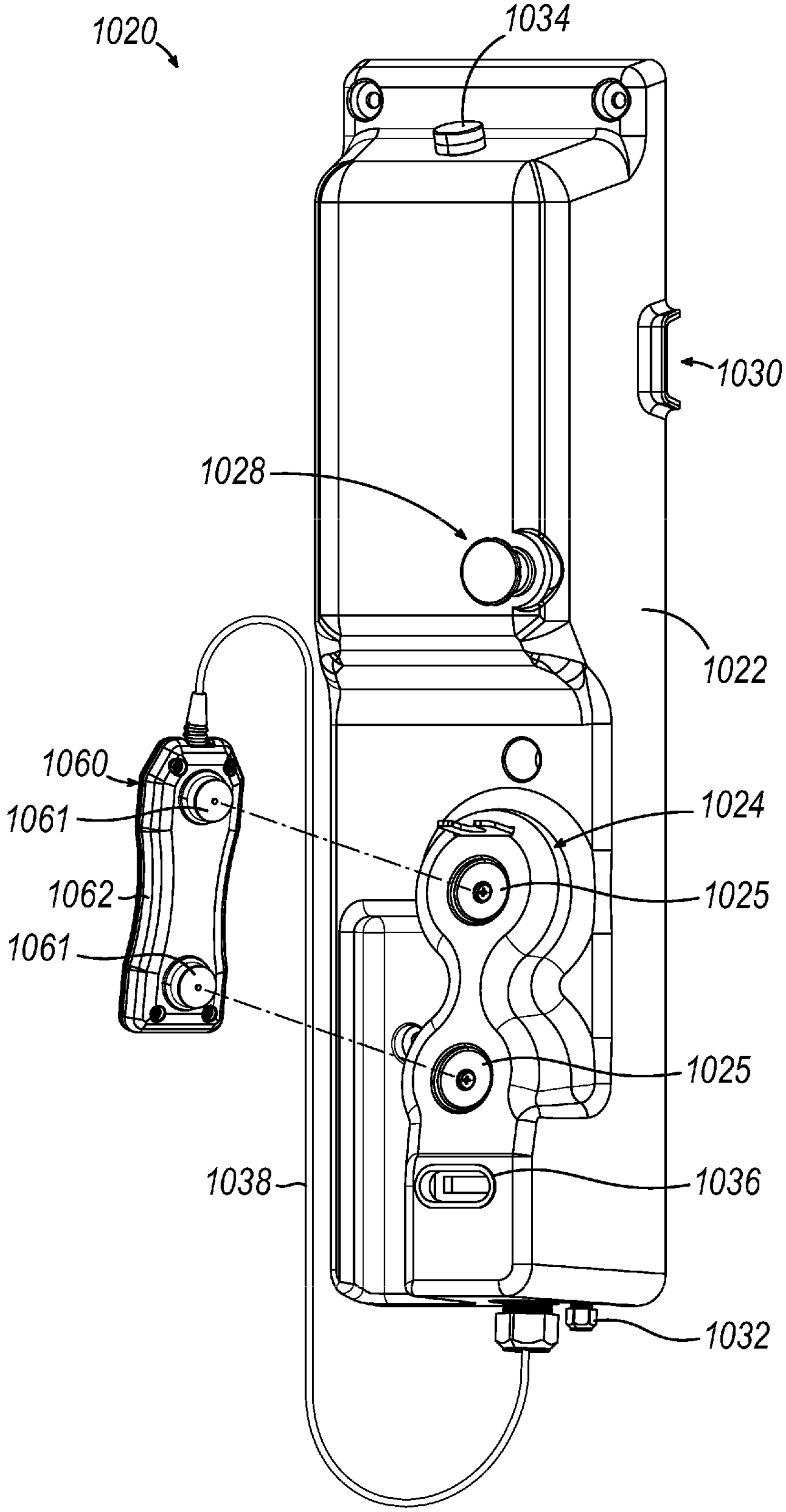
FIG. 20 is a perspective view of the casing of FIG. 20, with a pendant decoupled from the casing.

Pendant recess (1024) of casing (1022) is dimensioned to selectively receive and house pendant (1060). FIG. 20 shows pendent (1060) including at least one magnetic element (1061) and casing (1022) including a metal plate (1025) located within pendant recess (1024). Therefore, magnetic element (1061) may magnetically fix pendant (1060) within pendant recess (1024) of casing (1022). Additionally, magnetic element (1061) may allow a user to detach pendant (1060) from casing (1022) and then attach pendant (1060) to a lift post (1000, 1004) such that pendant (1060) may be used in accordance with the description herein while attached to lift post (1000, 1004).

Pendant (1060) is in communication with suitable components of user-interface control assembly (1020) via retractile remote cable (1038). While pendant (1060) is housed within pendant recess (1024), retractile remote cable (1038) is housed within cable recess (1026). Retractile remote cable (1038) is a pendant cord that is a retractile, coiled, or curly cable that may stretch between a retracted length (e.g., 2 feet) and an extended length (e.g., 9 feet). Retractile remote cable (1038) may be biased toward its retracted length such that if a technician grabs pendant (1060) and extends cable (1038), moving pendant (1060) away from casing (1022), then releases pendant (1060), the resilient nature of cable (1038) may retract back toward the retracted length near casing (1022). As will be described in greater detail below, pendant (1060) is in suitable communication with variable frequency drive (1046) such the pendant (1060) may selectively activate motor (1012) to acuate lift structures (1002, 1006) in accordance with the description herein.

Pendant (1060) in this embodiment includes a body (1062) and four buttons (1064, 1066, 1068, 1070). Buttons (1064, 1066, 1068, 1070) are in suitable communication with variable frequency drive (1046) such that each button (1064, 1066, 1068, 1070) may instruct variable frequency drive (1046) and other components to actuate lift structures (1002, 1006) in a specified manner. The first three buttons (1064, 1066, 1068, 1070) may function substantially similar to buttons (902, 904, 906) described above.

One of the buttons (1064, 1066, 1068, 1070) may be used to instruct variable frequency drive (1046) to actuate lift structures (1002, 1006) at a first speed. The first speed may be, for example, the standard speed (206) or a predetermined fraction of the standard speed (e.g., 50% of standard speed, 25% of standard speed, and so on). This first one of buttons (1064, 1066, 1068, 1070) may provide a substantially static raise speed when pressed and may be advantageous for fine adjustments of the lift structure such as may be required when a user is visually spotting to ensure engagement of the lift with a vehicle.

A second one of buttons (1064, 1066, 1068, 1070) may be used to instruct variable frequency drive (1046) to actuate lift structures (1002, 1006) at a dynamic variable speed that is determined using, as a mere example, steps such as those shown in FIG. 3. This may allow a user to raise the lift structure at an optimized speed that is determined and achieved using an incremental or continuous feedback loop, as has been described herein.

A third one of buttons (1064, 1066, 1068, 1070) may be used to instruct variable frequency drive (1046) to actuate lift structures (1002, 1006) to lower at a static speed, or a variable speed that may be influenced by gravity or the particular mechanism of the vehicle lift. As an example, the third one of buttons (1064, 1066, 1068, 1070) may cause a pressurized hydraulic member to release fluid under the force of gravity or cause a lift screw to rotate in a lowering direction under the force of gravity.

A fourth one of buttons (1064, 1066, 1068, 1070) may be used to lock lift structures (1002, 1006) at a specified height using a locking assembly. For example, the fourth button may be configured to fire a lowering valve to bring the vehicle weight onto the mechanical lock system and off the hydraulics.

Emergency stop (1028) is configured such that, when pressed, the emergency stop (1028) instructs the variable frequency drive (1046) to halt all lift motion. Cable inlet (1030) is configured to couple with a cable (not shown) in order to establish communication between user-interface control assemblies (1020) and non-user-interface control assemblies (1040). Air inlet (1032) runs to an air cylinder inside casing (1022) that is configured to acuate mechanical locks. Indicator light (1034) is configured to provide feedback to a technician via lights such as when the lift (20) has been fully lowered off the hydraulics and onto the mechanical locks.

View screen (1036) may be substantially similar to display (702) described above. In some instances, view screen (1036) may be configured to show motor speed but can also be configured to show other information such as error codes. In this embodiment, input buttons for view screen (1036) may be accessed by removing casing (1022). Input buttons may have any suitable function as would be apparent to one skilled in the art in view of the teachings herein.

The above-mentioned components for user-interface control assembly (1020) are merely illustrative. It should be understood that any suitable components may be incorporated into user-interface control assembly (1020) as would be apparent to one skilled in the art in view of the teachings herein.

Figure 22:
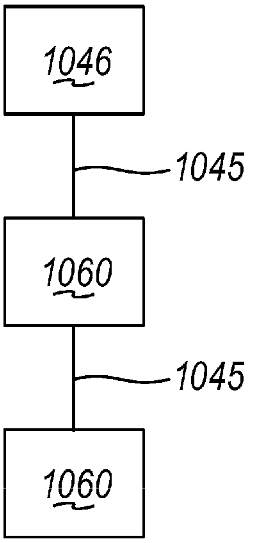
FIG. 22 is a schematic diagram of a pair of pendants of the user-interface controller assembly of FIG. 18 in communication with a variable frequency drive of the non-user-interface control assembly of FIG. 16.
Figure 23:
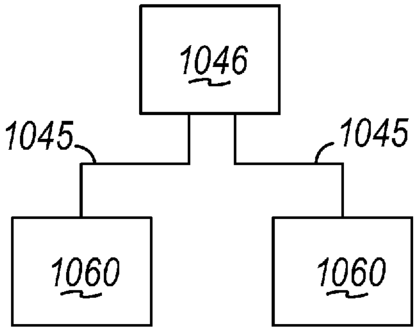
FIG. 23 is another exemplary schematic diagram of a pair of pendants of the user-interface controller assembly of FIG. 18 in communication with a variable frequency drive of the non-user-interface control assembly of FIG. 16.

As mentioned above, it may be desirable to have a user-interface control component associated with each lift post (100, 104), where the system requires the same input to be simultaneously pressed on both sides of lift (10) before lift motion of lift structures (102, 106) is started. FIGS. 22-23 show two different ways in which pendants (600) could be wired with each other and with variable frequency drive (1046) in order to accomplish the above-mentioned functionality.

First, as shown in FIG. 22, a first pendant (1060) may be wired in series with a second pendant (1060) via electrical wiring (1045), while the second pendant (1060) may also be wired in series with variable frequency drive (1060). The series connection between pendant (1060) and variable frequency drive (1046) may be configured such that users need to be simultaneously pressing the same button on both pendants (1060) in order to activate variable frequency drive (1046).

In FIG. 23, both pendants (1060) may be wired directly to variable frequency drive (1060), however variable frequency drive (1060) is programmed such that variable frequency drive (1060) must simultaneously receive a signal indicating both pendants (1060) are simultaneously pressing the same button in order to accomplish the above-mentioned functionality.

Therefore, both examples shown in FIGS. 22-23 allow for one technician for each lift post (1000, 1004) to confirm alignment of their respective lift structure (1002, 1006), then press the desired input on pendant (1060) to indicate their intention to actuate that respective lift structure (1002, 1006). Once the same input on each user-interface control component is pressed simultaneously, lift structures (1002, 1006) may then move relative to lift posts (1000, 1004).

It should be understood that not all buttons (1064, 1066, 1068, 1070) necessarily need to have this “simultaneous press” requirement, as some buttons (1064, 1066, 1068, 1070) may only require a button (1064, 1066, 1068, 1070) on one pendant (1060) to be activated in order to perform the desired function. Any suitable button (1064, 1066, 1068, 1070) may require simultaneous pressing by both pendants (1060) in order to activate variable frequency drive (1060), valves, or other components to achieve the desired functionality as would be apparent to one skilled in the art in view of the teachings herein.

As described above, lift (10, 20) may include variable frequency drive (110, 304, 1046) configured to provide variable lift performance in order to actuate lift structures (102, 106, 1002, 1006) upwards at either a static raise speed or a dynamic raise speed. For example, the static raise speed may be a slower speed advantageous for fine adjustments of the lift structure; while the dynamic raise speed may be a faster raise speed advantageous for raising a vehicle at an optimized speed. The static raise speed may be substantially uniform over a broad range of vehicle loads supported by lift structures (102, 106, 1002, 1006); while the dynamic raise speed may be determined based, at least in part, on a measurement related to the weight of the specific vehicle. As also described above, lift (10, 20) may include inputs, such as buttons (902, 904, 1064, 1066, 1068, 1070), configured to instruct variable frequency drive (304, 1046) to operate lift (10, 20) at either the static raise speed or the dynamic raise speed such that a user may selectively raise lifts structures (102, 106, 1002, 1006) at a desired raise speed. In some instances, it may be desirable to lower lift structures (102, 106, 1002, 1006) as multiple speeds, thereby allowing for both a slow descent speed and a fast descent speed; where the slow descent speed may be used for fine adjustments and the fast descent speed may be used for optimized performance. Additionally, in some instances, it may be desirable to have the functionality to raise and lower lift structures (102, 106, 1002, 1006) at multiple speeds, thereby allowing both fine adjustments and optimized performance while either raising or lowering a vehicle.

Figure 24:
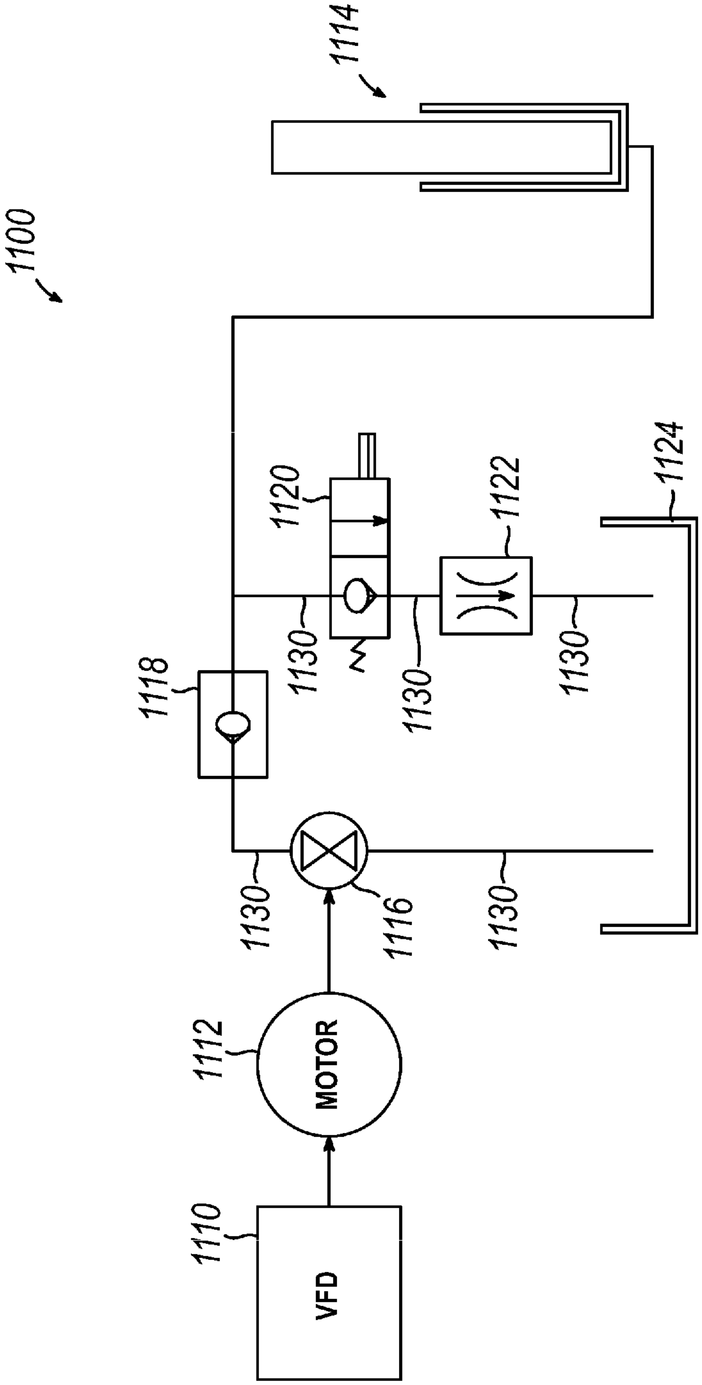
FIG. 24 is a schematic diagram of an exemplary variable frequency drive, motor, and hydraulic assembly that may be readily incorporated into the lift of FIG. 1 or FIG. 15.
Figure 25:
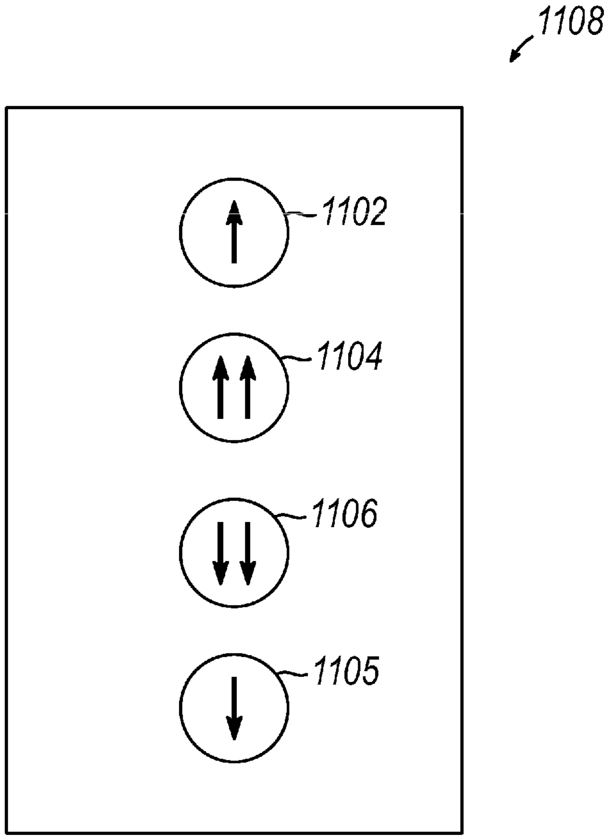
FIG. 25 is a schematic diagram of an exemplary pendant control that may be used to control the variable frequency drive, motor, and hydraulic assembly of FIG. 24.

FIG. 24 shows an exemplary variable frequency drive (1110), motor (1112), and hydraulic system (1100) that may be readily incorporated into lift (10, 20) in order to actuate lift structures (102, 106, 1002, 1006) in accordance with the description herein, while FIG. 25 shows an exemplary pendant control (1108) that may be readily incorporated into lift (10, 20) in order to activate variable frequency drive (1110), motor (1112), and/or hydraulic system (1100) in accordance with the description herein.

Variable frequency drive (1110) and motor (1112) may be substantially similar to variable frequency drive (110, 304, 1046) and motor (112, 306, 1012) described above, with differences elaborated below. Variable frequency drive (1110) may include the features of lift controller (108) and may include any of the features of control components (101, 300, 301, 311, 315, 331, 341, 351, 800) as would be apparent to one skilled in the art in view of the teachings herein. Therefore, variable frequency drive (1110) and motor (1112) may be configured to raise lift structures (102, 106, 1002, 1006) at a static raise speed and a dynamic raise speed in accordance with the description herein.

As will be described in greater detail below, variable frequency drive (1110), motor (1112), and hydraulic system (1100) may also be configured to lower lift structures (102, 106, 1002, 1006) in a fast descent mode and a slow descent mode. Therefore, in one aspect of the disclosure, a user may lower lift structures (102, 106, 1002, 1006) in a fast descent mode for lowering a vehicle at an optimized speed; or a user may lower lift structures (102, 106, 1002, 1006) in a slow descent mode for lowering a vehicle with fine adjustments into a desired position. Further, pendant control (1108) may be used in order to select which descent speed to utilize.

Hydraulic system (1100) includes a lift cylinder (1114), a pump (1116), a check valve (1118), a hydraulic valve (1120), a flow control assembly (1122), a hydraulic reservoir (1124), and hydraulic lines (1130). Lift cylinder (1114) may be suitably attached to one or more lift structures (102, 106, 1002, 1006) such that lift cylinder (1114) may raise and lower a respective lift structure(s) (102, 106, 1002, 1006) in accordance with the description herein. While in the current example, one lift cylinder (1114) is shown, any suitable number of lift cylinders (1114) may be used as would be apparent to one skilled in the art in view of the teachings herein. For example, there may be one lift cylinder (1114) for each corresponding lift structure (102, 106, 1002, 1006) utilized in lift (10, 20).

Hydraulic lines (1130) provide fluid communication between various components of hydraulic system (1100). Motor (1112) is configured to activate pump (1116) in order to pump hydraulic fluid from reservoir (1124), through check valve (1118), and toward hydraulic cylinder (1114) via hydraulic lines (1130) such that hydraulic cylinder (1114) may raise lift structures (102, 106, 1002, 1006) in accordance with the description herein. Therefore, as hydraulic fluid is pumped into hydraulic cylinder (1114), lift structure (102, 106, 1002, 1006) is raised. Conversely, as hydraulic fluid exits hydraulic cylinder (1114) in accordance with the description herein, lift structure (102, 106, 1002, 1006) is lowered. Hydraulic cylinder (1114) may include any suitable components as would be apparent to one skilled in the art in view of the teachings herein. Likewise, pump (1116) may include any suitable components as would be apparent to one skilled in the art in view of the teachings herein.

Check valve (1118) is configured to limit the flow of hydraulic fluid in one direction; which is from pump (1116) toward hydraulic cylinder (1114). Therefore, check valve (1118) is configured to inhibit hydraulic fluid from flowing back toward pump (1116) via check valve (1118). Check valve (1118) may include any suitable components as would be apparent to one skilled in the art in view of the teachings herein.

Hydraulic valve (1120) is in fluid communication with a portion of hydraulic lines (1130) interposed between cylinder (1114) and check valve (1118). Hydraulic valve (1120) is also in fluid communication with flow control assembly (1122). Flow control assembly (1122) is further in fluid communication with hydraulic reservoir (1124) such that flow control assembly (1122) is fluidly interposed between hydraulic reservoir (1124) and hydraulic valve (1120).

Hydraulic valve (1120) is configured to actuate between a normally closed position and an open position. Hydraulic valve (1120) is normally closed such that hydraulic fluid is inhibited from flowing through hydraulic valve (1122) toward flow control assembly (1112) in the closed position. Therefore, when motor (1112) is activated to raise lift structure (102, 106, 1002, 1006) in accordance with the description herein, hydraulic valve (1120) is in the normally closed state to inhibit hydraulic fluid from being inadvertently pumped through flow control (1120) and back into reservoir (1124). With motor (1112) activated and hydraulic valve (1120) in the normally closed position, hydraulic fluid is pumped into hydraulic cylinder (1114), thereby raising the corresponding lift structure(s) (102, 106, 1002, 1006).

Hydraulic valve (1120) is configured to switch from the normally closed position into an open position in order to allow hydraulic fluid to exit cylinder (1114) and pass through both hydraulic valve (1120) and flow control assembly (1112) in order to lower lift structures (102, 106, 1002, 1006) in accordance with the description herein. Hydraulic valve (1120) may be in electrical communication with pendant control (1108). In such aspects of the disclosure, pendant control (1108) in configured to selectively open hydraulic valve (1112) to lower lift structure (102, 106, 1002, 1006) in accordance with the description herein (in either fast descent mode or slow descent mode), thereby allowing hydraulic fluid to flow from cylinder (1114) and into hydraulic reservoir (1124) via hydraulic valve (1120) and flow control assembly (1122). With hydraulic fluid exiting cylinder (1114), lift structure (102, 106, 1002, 1006) is lowered. In order to cease lowering of lift structures (102, 106, 1002, 1006), pendant control (1108) may instruct hydraulic valve (1120) to return to the normally closed position, thereby inhibiting hydraulic fluid from flowing out of cylinder (1114) into hydraulic reservoir (1124). Hydraulic valve (1120) may include any suitable components as would be apparent to one skilled in the art in view of the teachings herein.

Flow control assembly (1122) is configured to limit the volumetric flow rate of hydraulic fluid exiting cylinder (1144) toward reservoir (1124) via flow control assembly (1122). In particular, flow control assembly (1122) is configured to limit such a volumetric flow rate to a maximum value ($Q_{max}$). In other words, flow control assembly (1122) may inhibit and/or restrict the volumetric flow rate of hydraulic fluid exiting cylinder (1114) into reservoir (1123) from exceeding the maximum value ($Q_{max}$). As mentioned above, hydraulic fluid exiting cylinder (1114) allows lift structures (102, 106, 1002, 1006) to lower. The lowering speed of lift structures (102, 106, 1002, 1006) may be at least partially based on the volumetric flow rate of hydraulic fluid exiting cylinder (1114). Flow control assembly (1122) is thereby configured to limit the lowering of lift structures (102, 106, 1002, 1006) to a maximum lowering speed.

Flow control assembly (1122) may be configured to provide a substantially constant maximum volumetric flow rate ($Q_{max}$) such that the maximum lowering speed of lift structure (102, 106, 1002, 1006) is substantially uniform over a wide range of vehicle loads. In some examples, flow control assembly (1122) includes a compensated flow control. Any suitable maximum volumetric flow rate ($Q_{max}$) may be used as would be apparent to one skilled in the art in view of the teachings herein. For example, the maximum volumetric flow rate ($Q_{max}$) that is regulated by flow control assembly (1122) may be 5 gallons per minute.

Figure 26:
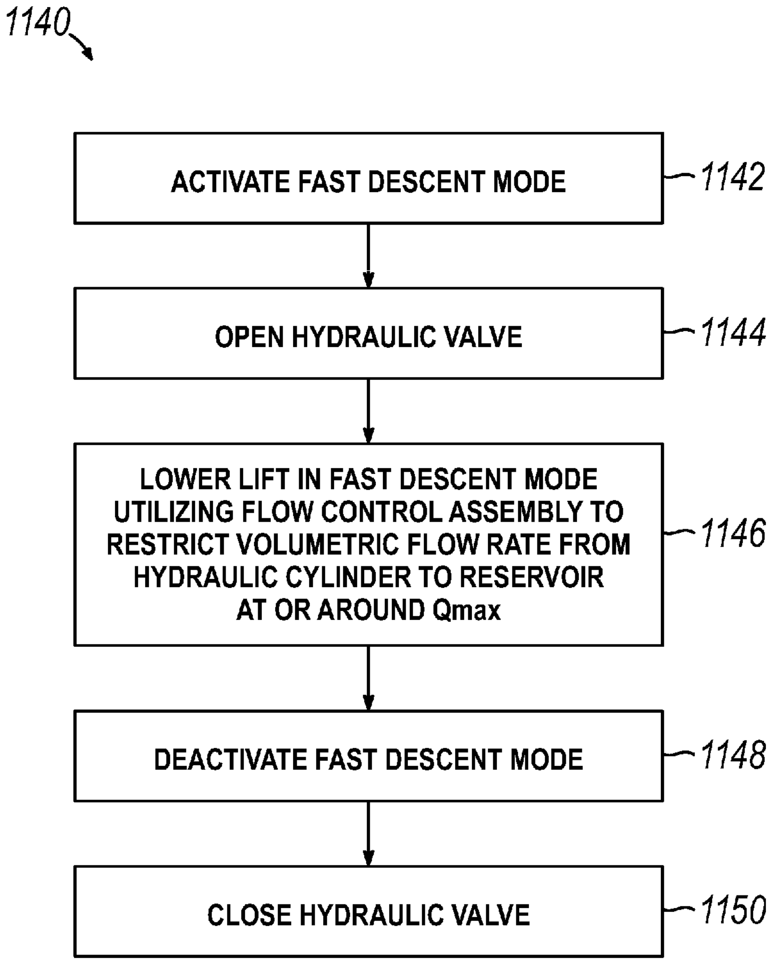
FIG. 26 is a flowchart of an exemplary set of steps of utilizing the variable frequency drive, motor, and hydraulic assembly of FIG. 25 to utilize a fast descent mode.
Figure 27:
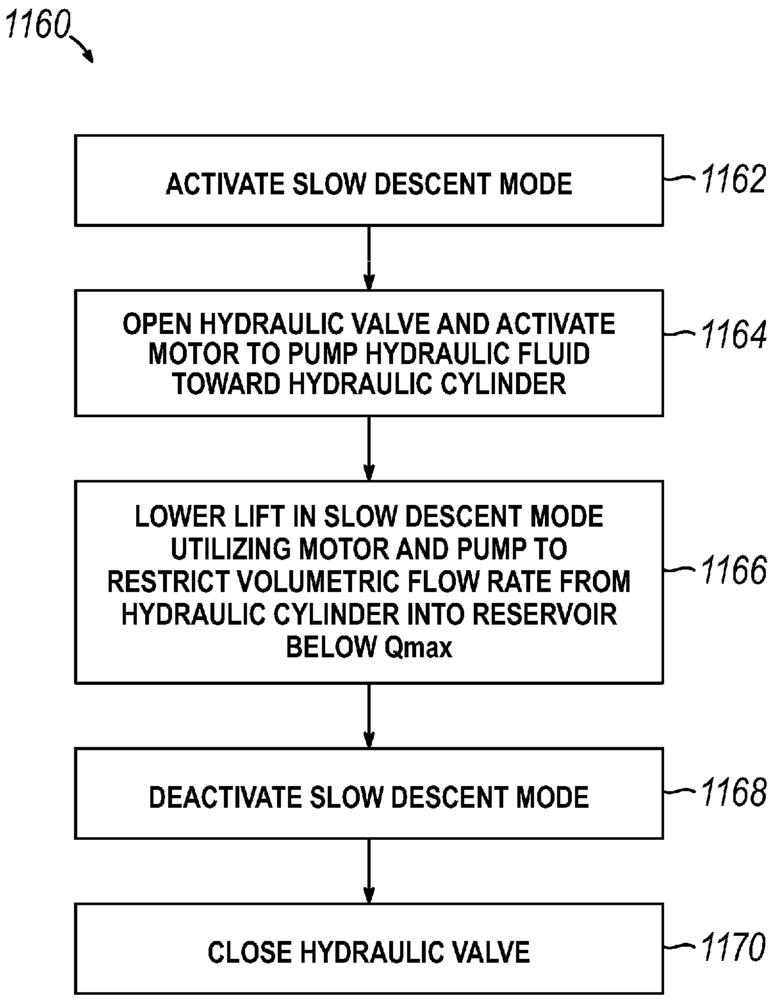
FIG. 27 is a flowchart of an exemplary set of steps of utilizing the variable frequency drive, motor, and hydraulic assembly of FIG. 25 to utilize a slow descent mode.

As mentioned above, variable frequency drive (1110), motor (1112), and hydraulic system (1100) may be configured to lower lift structures (102, 106, 1002, 1006) in a fast descent mode (1140) (see FIG. 26) and a slow descent mode (1160) (see FIG. 27). FIG. 26 shows an exemplary use of the components shown in FIGS. 24-25 to lower a vehicle in a fast descent mode (1140). When a user desires to use fast descent mode (1140), the user may initially activate fast descent mode (1142) while lift structures (102, 106, 1002, 1006) have suitably raised a vehicle in accordance with the description herein. In aspects of the disclosure where pendant control (1108) (see FIG. 25) is used, a user may press the fast descent mode button (1106) in order to activate fast descent mode (1142).

In response to activation of fast descent mode (1142), variable frequency drive (1110) or any other suitable component instructs hydraulic valve (1120) to transition from the normally closed position into the open position (1144). It should be understood that, with hydraulic valve (1120) in the open position, the weight of the lifted vehicle may push hydraulic fluid to exit cylinder (1114), travel through both hydraulic valve (1120) and flow control assembly (1122) and enter reservoir (1124) to thereby allow cylinder (1114) and the corresponding lift structure(s) (102, 106, 1002, 1006) to lower in fast descent mode (1146). In some aspects of the disclosure, pump (1116) is deactivated in fast descent mode (1140) such that pump (1160) is not pumping hydraulic fluid toward cylinder (1114) while lowering (1146) cylinder (1114) and the corresponding lift structure(s) (102, 106, 1002, 1006) in accordance with the description herein.

As mentioned above, the volumetric flow rate of hydraulic fluid exiting cylinder (1114), and therefore the speed which lift structure(s) (102, 106, 1002, 1006) is lowered, is restricted by flow control assembly (1122) to a maximum value ($Q_{max}$). In fast descent mode (1140), flow control assembly (1122) may be the primary means of restricting volumetric flow rate of hydraulic fluid exiting cylinder (1114) and entering reservoir (1124) such that the volumetric flow rate in fast descent mode ($Q_{fast}$) is substantially equal to the maximum value ($Q_{max}$). Since the volumetric flow rate of hydraulic fluid exiting cylinder (1114) may at least partially dictate the lowering speed of lift structures (102, 106, 1002, 1006), flow control assembly (1122) may control the maximum lowering speed at which corresponding lift structure(s) (102, 106, 1002, 1006) is lowered (1146) in fast descent mode (1140).

Flow control assembly (1122) may be configured to provide a substantially uniform maximum volumetric flow rate ($Q_{max}$)—and, therefore, a substantially constant maximum lowering speed—even if lift structures (102, 106, 1002, 1006) support a wide range of vehicles having different loads and weight. In other words, in fast descent mode, cylinder (1114) and corresponding lift structures (102, 106, 1002, 1006) may descend at a substantially constant maximum lowering speed, even while supporting vehicles having a variety of different weights. A user may utilize fast descent mode to lower a supported vehicle at a maximum uniform lowering speed for optimized performance.

Turning back to FIG. 26, once a user has lowered (1146) cylinder (1114) and corresponding lift structure(s) (102, 106, 1002, 1006) in fast descent mode (1140) to a desired position. A user may deactivate fast descent mode (1148), which in turn actuates hydraulic valve (1120) into the closed position (1150), thereby ceasing downward movement of cylinder (1114) and corresponding lift structure(s) (102, 106, 1002, 1006). In aspects of the disclosure where pendant control (1108) (see, e.g., FIG. 25) is used, a user may release the fast descent mode button (1106) in order to deactivate fast descent mode (1148).

FIG. 27 shows an exemplary use of the components shown in FIGS. 24-25 to lower a vehicle utilizing a slow descent mode (1160). When a user desires to utilize slow descent mode (1160), a user may initially activate slow descent mode (1162) while lift structures (102, 106, 1002, 1006) have suitably raised a vehicle in accordance with the description herein. In aspects of the disclosure where pendant control (1108) (see, e.g., FIG. 25) is used, a user may press the slow descent mode button (1105) in order to activate slow descent mode (1162).

In response to activation of slow descent mode (1162), variable frequency drive (1110) or any other suitable component instructs hydraulic valve (1120) to transition from the normally closed position into the open position, as shown in step (1164). However, unlike fast descent mode (1140), variable frequency drive (1110) also activates motors (1112) and pump (1116) to pump hydraulic fluid toward cylinder (1114), as also shown in step (1164).

With hydraulic valve (1120) in the open position, the weight of the lifted vehicle may push hydraulic fluid to exit cylinder (1114), travel through both hydraulic valve (1120) and flow control assembly (1122), and enter reservoir (1124) to thereby allow cylinder (1114) and the corresponding lift structure(s) (102, 106, 1002, 1006) to lower in slow descent mode (1166). However, as shown in step (1166), with pump (1116) activated in slow descent mode (1160), hydraulic fluid may be also being pumped toward cylinder (1114), thereby providing at least some degree of resistance from hydraulic fluid exiting cylinder (1114) due to the weight of the lifted vehicle. In other words, in step (1166), variable frequency drive (1100) may activate motor (1112) and pump (1116) in order to pump a suitable amount of hydraulic fluid toward cylinder (1114) such that the slow decent mode volumetric flow rate ($Q_{slow}$) exiting cylinder (1114) and entering reservoir (1124) is less than the maximum value ($Q_{max}$) allowable by flow control assembly (1122), thereby providing a lowering speed that is slower than the maximum lowering speed in fast descent mode (1140).

Additionally in step (1166), variable frequency drive (1110) may utilize any of the features of control components (101, 300, 301, 311, 315, 331, 341, 351, 800) to provide a uniform slow descent mode volumetric flow rate ($Q_{slow}$) even if lift structures (102, 106, 1002, 1006) support a wide range of vehicles having different loads and weights. In other words, variable frequency drive (1110) may alter the performance of pump (1116) in slow descent mode (1160) based on a measured weight of the supported vehicle to ensure the slow descent mode volumetric flow rate ($Q_{slow}$) is substantially uniform over a broad range of vehicle weights. Therefore, variable frequency drive (1110) may provide for a substantially constant slow lowering speed for a wide range of vehicles having different loads and weights.

Turning back to FIG. 27, once a user has lowered (1166) cylinder (1114) and corresponding lift structure(s) (102, 106, 1002, 1006) in slow descent mode (1160) to a desired position, a user may deactivate slow descent mode (1168), which in turn actuates hydraulic valve (1120) back into the closed position (1170) and deactivates motor (1110) to no longer pump hydraulic fluid toward cylinder (1114). In aspects of the disclosure where pendant control (1108) (see, e.g., FIG. 25) is used, a user may release the slow descent mode button (1105) in order to deactivate fast descent mode (1148).

It should be understood that, while in some aspects of the disclosure pendant control (1108) is utilized to control decent modes (1140, 1160), any other suitable means may be utilized to activate and deactivate decent modes (1140, 1160) as would be apparent to one skilled in the art in view of the teachings herein. For example, a user interface that is affixed to lift post (100, 104, 1000, 1004) may be used to activate and deactivate descent modes (1140, 1160).

While fast descent mode (1140) is described above with pump (1116) being deactivated, this is merely optional. In some aspects of the disclosure, pump (1116) may be activated in fast descent mode (1140) in order to assist (or even replace) flow control assembly (1122) in maintaining the fast decent mode volumetric flow fate ($Q_{fast}$) in accordance with the description herein.

Turning to FIG. 25, pendant control (1108) may be substantially similar to pendant control (900) and/or pendant (1060) described above, with different features elaborated herein. Therefore, even though not explicitly shown, pendant control (1108) may include any of the various features of pendant control (900) and/or pendant (1060) described above. Pendant control (1108) is in electrical communication with variable frequency drive (1110), motor (1112), hydraulic valve (1120), and/or any other suitable components as would be apparent to one skilled in the art in view of the teachings herein. Pendant control (1108) may be in wireless and/or wired communication with such components. In some instances, pendant control (1108) may be fixedly attached to a corresponding post (100, 104, 1000, 1004). In other instances, pendant control (1108) is removably attached to a corresponding post (100, 104, 1000, 1004). In still other instances, pendant control (1108) is attached to a corresponding post (100, 104, 1000, 1004) via a retractile remote cable. Of course, pendant control (1108) may physically associate with any suitable components of a corresponding lift (10, 20) as would be apparent to one skilled in the art in view of the teachings herein.

Pendant control (1108) includes a first-up button (1102), a second-up button (1104), a fast descent mode button (1106), and a slow descent mode button (1105). As mentioned above, fast descent mode button (1106) is configured to initiate a fast descent (1140) of a lift (10, 20) containing hydraulic system (1100), variable frequency drive (1110), and motor (1112); while slow descent mode button (1105) is configured to initiate a slow descent (1160) of a lift (10, 20) containing hydraulic system (1100), variable frequency drive (1110), and motor (1112).

First-up button (1102) and second-up button (1104) may be substantially similar to first button (902) and second button (904) described above, respectively. Therefore, when pressed, first-up button (1102) may activate variable frequency drive (1110) to provide a substantially static raise speed; which may be advantageous for fine adjustments of the lift structure while raising a vehicle. Second-up button (1104), when pressed, may activate variable frequency drive (1110) to raise the lift structure at a dynamic variable speed; which may be advantageous for raising the vehicle at an optimized speed. As mentioned above, variable frequency drive (1110) may include the features of lift controller (108) and may include any of the features of control components (101, 300, 301, 311, 315, 331, 341, 351, 800) useful to achieve such a dynamic variable speed.

Therefore, a user may use pendant control (1108), hydraulic system (1100), variable frequency drive (1110), and motor (1112) to actuate lift structures (102, 106, 1002, 1006) upward at both static and dynamic lift speeds, and downward at both fast and slow descent speeds. It should be understood that while only two raising speeds and two descent speeds are utilized in the current aspects of the disclosure, hydraulic system (1100), variable frequency drive (1110), and motor (1112) may be configured to actuate lift structures (102, 106, 1002, 1006) at multiple lift and descent speeds.

Figure 28:
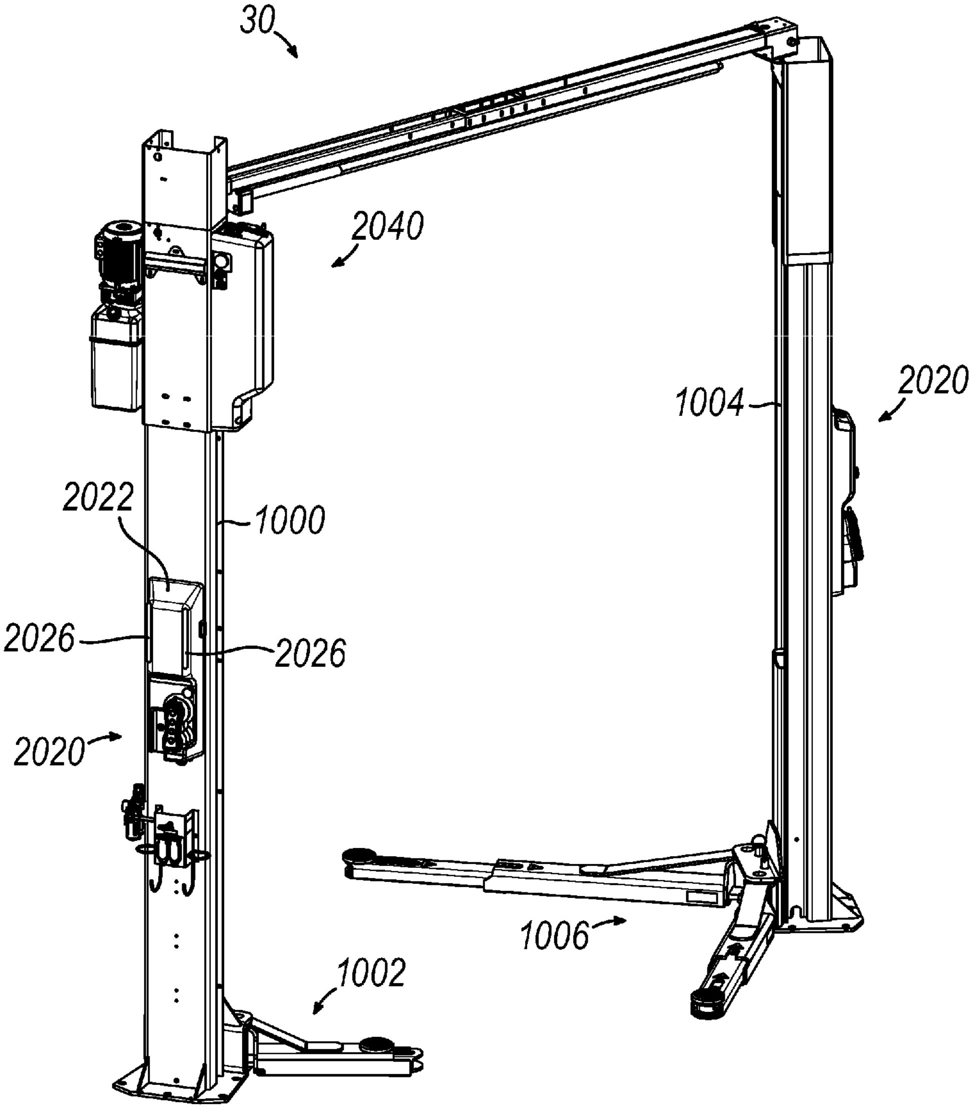
FIG. 28 depicts a perspective view of another exemplary lift.

FIG. 28 shows an alternative lift (30) that may be used in place of lift (20). Lift (30) may include any of the various features described above, including being raised at a static or dynamic speed, as well as being lowered at a fast or a slow speed. Therefore, lift (30) may be substantially similar to lift (20) described above, with differences elaborated below. Lift (30) includes lift posts (1000, 1004), lift structures (1002, 1006), a pair of user-interface control assemblies (2020) associated with a lower portion of each respective lift post (1000, 1004), and a non-user-interface control assembly (2040) associated with an upper portion of lift post (1000). User-interface control assemblies (2020) and non-user-interface control assembly (2040) are substantially similar to user-interface control assembly (1020) and non-user-interface control assembly (1040) describe above, respectively, with differences elaborated below. In particular, each assembly (1020, 1040) includes a pair of smart light strip indicators (2026, 2046) that are configured to illuminate with a variety of patterns, colors, and/or brightness to indicate to a user certain conditions related to lift (30).

Having multiple light strip indicator (2026, 2046) may be advantageous to help ensure lifting conditions are visually communicated to a user, even if the user is located at a location on the shop floor that may have an obstructed view of one or more of the light strip indicators (2026, 2046). Additionally, having light strip indicators (2026, 2046) that illuminate with a variety of patterns, colors, and/or brightness may be beneficial in order to visually communicate the movement mode and/or the direction and speed of movement of lift structures (1002, 1006).

Figure 29:
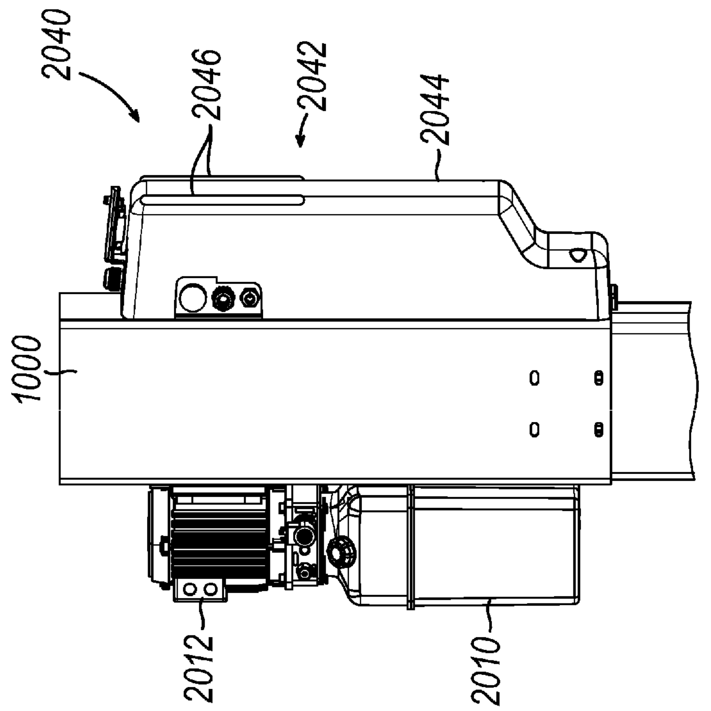
FIG. 29 depicts a perspective view of an exemplary non-user-interface assembly of the lift of FIG. 28.

Turning to FIG. 29, non-user-interface control assembly (2040) includes a motor (2012), a hydraulic reservoir (2010), and an upper housing (2042) having a casing (2044) with a pair of smart light strip indicators (2046) located on both edges of upper housing (2042). Motor (2012), hydraulic reservoir (2010), and upper housing (2042) are substantially similar to motor (1012), hydraulic reservoir (1010), and upper housing (1042) described above, with differences elaborated below. It should be understood that non-user-interface control assembly (2040) may include the various features of non-user-interface control assembly (1040) described above, even if not explicitly shown and described.

Figure 30:
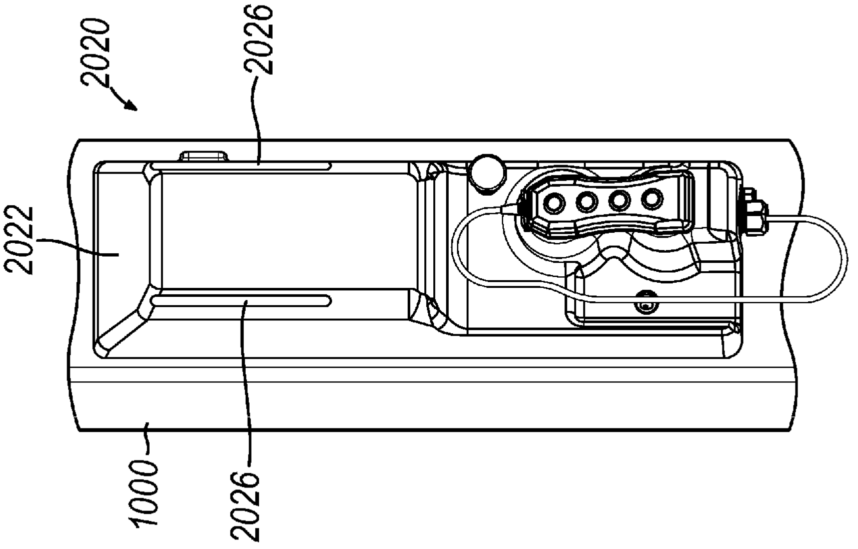
FIG. 30 depicts a perspective view of an exemplary user-interface assembly of the lift of FIG. 28.

Turning to FIG. 30, each user-interface control assembly (2020) includes a casing (2022) with a pair of smart light strip indicators (2026) located on opposite edges of casing (2022). It should be understood that user-interface control assembly (2020) may include the various features of user-interface control assembly (1020) described above, even if not explicitly shown and described.

Figure 31:
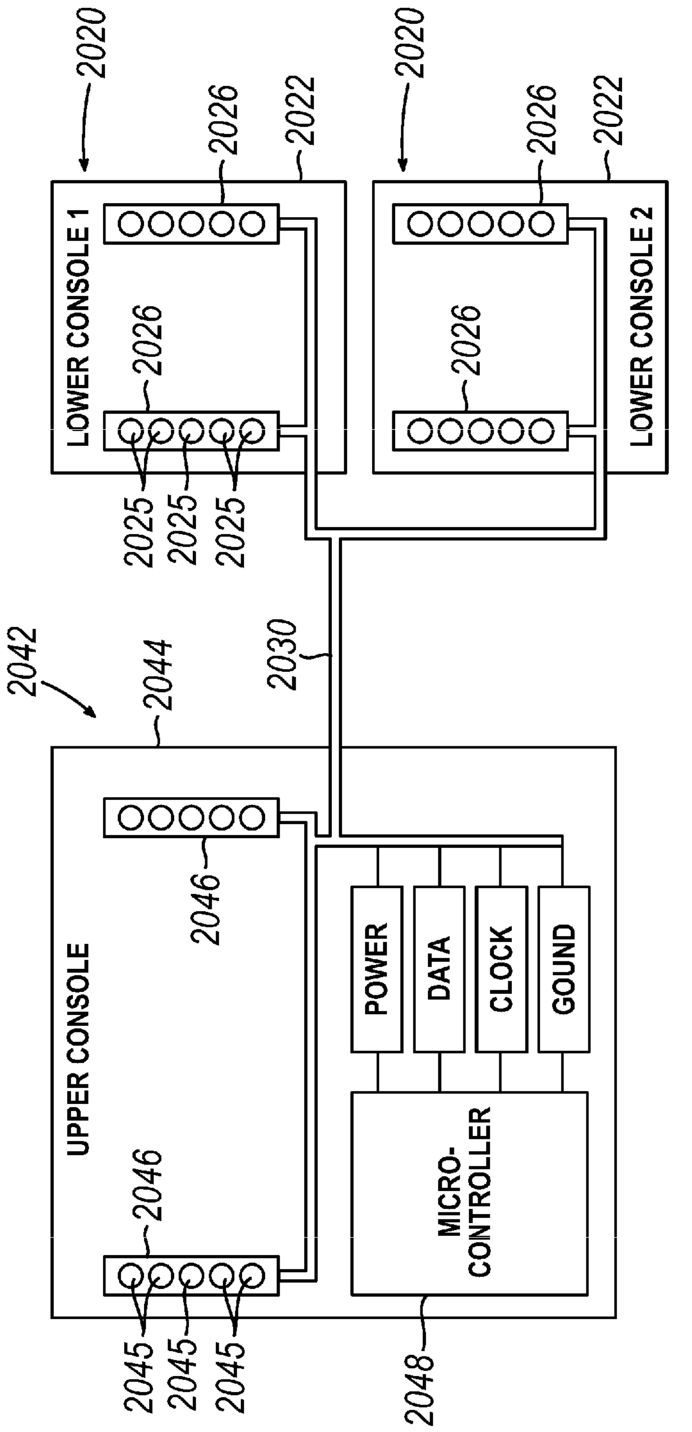
FIG. 31 depicts a schematic diagram of the non-user-interface assembly of FIG. 29 and a pair of user-interface assemblies of FIG. 30.

As shown in FIG. 31, upper housing (2042) contains a microcontroller (2048) in communication with each smart light strip indicator (2026, 2046) via electrical connections (2030). Electrical connections (2030) may extend through various components of lift pots (1000, 1004) and other components in order to electrically coupled microcontroller (2048) with smart light strip indicators (2026, 2046).

Each smart light strip (2026, 2046) contains a linear array of LEDs (2025, 2045). In the current example, each strip (2026, 2046) contains 5 LEDs (2025, 2045). However, any suitable number of LEDs (2025, 2045) may be used in each light strip (2026, 2046) as would be apparent to one skilled in the art in view of the teachings herein. LEDs (2025, 2045) in this example are multi-color lights and are dimmable, though lights with different features may be used in other implementations. Therefore, LEDs (2025, 2046) may be selectively illuminated with a multitude of colors and intensities. In particular, LEDs (2025, 2045) may be instructed by microcontroller (2048) when to illuminate, that what intensity to illuminate, and in what color to illuminate. Microcontroller (2048) may include a Serial Peripheral Interface (SPI) configured to instruct LEDs (2025, 2045) how to illuminate in accordance with the description herein. Each smart light strip indicator (2026, 2046) may also contain its own built-in smart controller configured to utilize information received from microcontroller (2048) in order to individually control each LED (2025, 2045) in a smart light strip indicator (2026, 2046).

Microcontroller (2048) may be in communication with a circuit board of lift (30) (similar to circuit board (1048) described above) such that microcontroller (2048) receives information on the operational status of lift (30). Microcontroller (2048) is configured to activate smart light strips (2026, 2046) in a particular fashion in response to receiving various information relating to the operational status of lift (30).

In one aspect of the disclosure, when lift (30) encounters an error or an emergency stop, microcontroller (2048) may receive information from various components of lift (30) conveying an error or emergency stop has occurred. In response, microcontroller (3048) may instruct each smart light strip (2026, 2046) to illuminate in a red pulsing pattern where each LED (2025, 2045) illuminates and deactivates together at a predetermined frequency.

In another aspect of the disclosure, after lift structures (1002, 1006) have been suitably actuated along posts (1000, 1004) to raise and/or lower a vehicle, a locking assembly is then actively engaged with lift structures (1002, 1006) such that a substantial amount of pressure on hydraulic components of the lift (30) is removed, microcontroller (2048) may receive information from various components of lift (30) conveying that the locking assembly is suitably engaged with lift structures (1002, 1006). In response, microcontroller (3048) may instruct each smart light strip (2026, 2046) to illuminate in a solid green pattern.

In another aspect of the disclosure, after lift structures (1002, 1006) have been suitably actuated along posts (1000, 1004) to raise and/or lower a vehicle, but a substantial amount of pressure is still measured within hydraulic components of the lift (30), microcontroller (2048) may receive information from various components of lift (30) conveying that a substantial amount of pressure is still measured within the hydraulic components. In response, microcontroller (2048) may instruct each smart light strip (2026, 2046) to illuminate yellow. In one example, LEDs (2025, 2045) in each smart strip (2026, 2046) may be constantly illuminated yellow, thereby indicating the conditions communicated to microcontroller (2048). In another example, LEDs (2025, 2045) in each smart strip (2026, 2046) may illuminate and deactivate uniformly in a pulsating fashion. In yet another example, LEDs (2025, 2045) may activate sequentially in a downward scrolling pattern. One example of a downward scrolling pattern includes LEDs (2025, 2045) in each strip (2026, 2046) illuminating in a yellow color sequentially such that the top LED (2024, 2045) in the linear array of LEDs (2025, 2045) is activated first, then a second LED (2025, 2045) located below the top LED (2025, 2045) is activated second, then a third LED (2025, 2045) located below the second LED (2025, 2045) is activated next, and so on until the bottom LED (2025, 2045) is activated. Once the desired number of LEDs (2025, 2045) has been sequentially activated, microcontroller (2048) may instruct LEDs (2025, 2045) to deactivate, and then reilluminate in the same sequential downward pattern. In another exemplary downward scrolling pattern, individual LEDs (2025, 2045) in each linear array may activate, and then deactivate, prior to activation of the next LED (2025, 2045) in the scrolling pattern. Therefore, in such an example, only one LED (2025, 2045) in each strip (2026, 2046) is activated at a time. In other examples, more than one LED (2025, 2045) in each strip (2026, 2046) is activated at a time, though the scrolling pattern is still applied. Downward scrolling patterns may indicate the potential for incidental downward movement of lift structures (1002, 1006) if hydraulic components of lift (30) undesirably lose a substantial amount of pressure. It should be understood that any suitable downward scrolling pattern may be used as would be apparent to one skilled in the art in view of the teachings herein.

In another aspect of the disclosure, as lift structures (1002, 1006) are being lowered, microcontroller (2048) may receive information from various components of lift (30) conveying that lift structures (1002, 1006) are being lowered, and whether or not lift structures (1002, 1006) are being lowered at a fast descent mode or a slow descent mode. In response, microcontroller (3048) may instruct each smart light strip (2026, 2046) to illuminate orange in a downward scrolling pattern, which may be similar to the downward scrolling patterns descried above. Additionally, the downward scrolling pattern used may vary depending on whether lift structures (1002, 1006) are being lowered at a fast descent mode or a slow descent mode. For example, if lift structures (1002, 1006) are being lowered in a fast descent mode, all five LEDs (2025, 2045) may be illuminated orange in the downward scrolling pattern; while if lift structures (1002, 1006) are being lowered in a slow descent mode, fewer LEDs (2025, 2045) may be illuminated orange in the same (or a different) downward scrolling pattern. As another example, if lift structures (1002, 1006) are being lowered in a fast descent mode, LEDs (2025, 2045) may be illuminated utilizing the downward scrolling pattern at a faster rate; while if lift structures (1002, 1006) are being lowered in a slow descent mode, LEDs (2025, 2045) may be illuminated utilizing the same (or a different) downward scrolling pattern at a slower rate. Therefore, the number of LEDs (2025, 2045) being illuminated, the frequency of illumination, the speed of the pattern, or any other suitable indicator as would be apparent to one skilled in the art in view of the teachings herein may indicate to a user how fast lift structures (1002, 1006) are moving, while the color of LEDs (2025, 2045) and direction of the scrolling pattern may indicate the direction lift structures (1002, 1006) are moving.

In another aspect of the disclosure, as lift structures (1002, 1006) are being raised, microcontroller (2048) may receive information from various components of lift (30) conveying that lift structures (1002, 1006) are being raised and whether or not lift structures (1002, 1006) are being raised at a dynamic speed or a static speed. In response, microcontroller (3048) may instruct each smart light strip (2026, 2046) to illuminate purple (or other color, of course, as will occur to those skilled in the art in view of this disclosure) in an upward scrolling pattern. Upward scrolling patterns may be analogous to the downward scrolling patterns described above, but the sequence of illumination is in the opposite direction, such that sequential illuminations are by LEDs (2025, 2045) located above the previously illuminated LED (2025, 2045). Additionally, the upward scrolling pattern used may vary depending on whether lift structures (1002, 1006) are being raised at a dynamic speed or a static speed. For example, if lift structures (1002, 1006) are being raised at a dynamic speed, all five LEDs (2025, 2045) may illuminate purple in the upward scrolling pattern; while if lift structures (1002, 1006) are being raised in a static speed, fewer LEDs (2025, 2045) may be illuminated purple in the same (or different) upward scrolling pattern. As another example, if lift structures (1002, 1006) are being raised at a dynamic speed, LEDs (2025, 2045) may be illuminated utilizing the upward scrolling pattern at a faster rate; while if lift structures (1002, 1006) are being raised at a static speed, LEDs (2025, 2045) may be illuminated using the same (or different) upward scrolling pattern at a slower rate. Therefore, the number of LEDs (2025, 2045) being illuminated, the frequency of illumination, the speed of the pattern, or any other suitable indicator as would be apparent to one skilled in the art in view of the teachings herein, may indicate to a user how fast lift structures (1002, 1006) are moving, while the color of LEDs (2025, 2045) and the direction of the scrolling pattern may indicate the direction lift structures (1002, 1006) are moving.

In another aspect of the disclosure, as lift structures (1002, 1006) are being lowered to the ground, and no substantial pressure is sensed within the hydraulic components, this may be an indicator the lift structures (1002, 1006) have reached the shop floor. In response, microcontroller (3048) may instruct each smart light strip (2026, 2046) to illuminate in a solid blue pattern.

It should be understood that the patterns and colors chosen in the above aspects of the disclosure are merely exemplary. Any suitable colors and illumination patterns may be utilized as would be apparent to one skilled in the art in view of the teachings herein.

The following examples relate to various non-exhaustive ways in which the teachings herein may be combined or applied. It should be understood that the following examples are not intended to restrict the coverage of any claims that may be presented at any time in this application or in subsequent filings related to this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

A first example is a lift system, comprising a lift post; a lift structure configured to actuate vertically along the lift post; a lift structure actuation assembly configured to drive vertical actuation of the lift structure along the lift post, the lift structure actuation assembly comprising a hydraulic cylinder operably coupled with the lift structure, a motor, a hydraulic pump configured to pump hydraulic fluid into the hydraulic cylinder in order to vertically raise the lift structure along the lift post, wherein the motor is configured to power the hydraulic pump, and a flow control assembly configured to limit hydraulic fluid exiting the hydraulic cylinder to a maximum volumetric flow rate, wherein the lift structure actuation assembly is configured to lower the lift structure in a fast descent mode and a slow descent mode, wherein the hydraulic pump is configured to pump hydraulic fluid toward the hydraulic cylinder in the slow descent mode such that hydraulic fluid exits the hydraulic cylinder at a slow volumetric flow rate, wherein the slow volumetric flow rate is less than the maximum volumetric flow rate.

A second example is a variation of the preceding example, wherein the lift structure actuation assembly, while in the fast descent mode, is configured to allow hydraulic fluid to exit the hydraulic cylinder at the maximum volumetric flow rate.

A third example is a variation of any one or more of the preceding examples, wherein the lift structure actuation assembly further comprises a hydraulic valve interposed between the flow control assembly and the hydraulic pump.

A fourth example is a variation of any one or more of the preceding examples, wherein the hydraulic valve has a normally closed configuration.

A fifth example is a variation of any one or more of the preceding examples, wherein the hydraulic valve is configured to inhibit hydraulic fluid from exiting the hydraulic cylinder into the flow control assembly in the normally closed configuration.

A sixth example is a variation of any one or more of the preceding examples, wherein the lift structure actuation assembly comprises a variable frequency drive configured to alter a power provided by the motor based on a measurement.

A seventh example is a variation of any one or more of the preceding examples, wherein the measurement comprises a load on the motor.

An eighth example is a variation of any one or more of the preceding examples, wherein the measurement comprises a current on the motor.

A ninth example is a variation of any one or more of the preceding examples, wherein the lift structure actuation assembly is configured to actuate the lift structure upward at a static speed and a dynamic speed, wherein the dynamic speed is based on the measurement.

A tenth example is a variation of any one or more of the preceding examples, further comprising a control pendant configured to initiate the fast descent mode and the slow descent mode.

An eleventh example is a variation of any one or more of the preceding examples, wherein the control pendant comprises a fast descent mode button and a slow descent mode button.

A twelfth example is a variation of any one or more of the preceding examples, wherein the control pendant is in wireless communication with the rest of the lift structure actuation assembly.

A thirteenth example is a variation of any one or more of the preceding examples, further comprising a check valve interposed between the pump and the hydraulic cylinder.

A fourteenth example is a variation of any one or more of the preceding examples, wherein the lift structure actuation assembly comprises a hydraulic reservoir in fluid communication with the pump.

A fifteenth example is a variation of any one or more of the preceding examples, wherein the flow control assembly comprises a pressure-compensated flow control.

A sixteenth example is a lift system, comprising a lift structure configured to actuate vertically between a lowered position and a raised position; a lift structure actuation assembly configured to drive the lift structure between the lowered position and the raised position, the lift structure actuation assembly comprising a hydraulic cylinder operably coupled with the lift structure, a motor, a hydraulic pump configured to pump hydraulic fluid into the hydraulic cylinder in order to vertically raise the lift structure, wherein the motor is configured to power the hydraulic pump, a flow control assembly configured to limit hydraulic fluid exiting the hydraulic cylinder to a maximum volumetric flow rate, and a hydraulic valve interposed between the flow control assembly and the hydraulic cylinder, wherein the hydraulic valve is configured to transition between a normally closed position and an open position, wherein the lift structure actuation assembly is configured to lower the lift structure toward the lowered position in a fast descent mode and a slow descent mode while the hydraulic valve is in the open position, wherein the hydraulic pump is configured to pump hydraulic fluid toward the hydraulic cylinder in the slow descent mode such that hydraulic fluid exits the hydraulic cylinder at a slow volumetric flow rate, wherein the slow volumetric flow rate is less than the maximum volumetric flow rate.

A seventeenth example is a variation of any one or more of the preceding examples, wherein the hydraulic pump is configured to be deactivated in the fast descent mode.

An eighteenth example is a variation of any one or more of the preceding examples, further comprising a lift post, wherein the lift structure is configured to actuate vertically along the lift post between the lowered position and the raised position.

A nineteenth example is a variation of any one or more of the preceding examples, wherein the motor is mounted on the lift post.

A twentieth example is a lift system, comprising a lift structure configured to actuate vertically between a lowered position and a raised position; and a lift structure actuation assembly configured to drive the lift structure between the lowered position and the raised position, the lift structure actuation assembly comprising a hydraulic cylinder operably coupled with the lift structure, a motor, a hydraulic pump configured to pump hydraulic fluid into the hydraulic cylinder in order to vertically raise the lift structure, wherein the motor is configured to power the hydraulic pump, wherein the lift structure actuation assembly is configured to lower the lift structure toward the lowered position in a fast descent mode and a slow descent mode, wherein hydraulic pump is configured to pump hydraulic fluid toward the hydraulic cylinder in the slow descent mode while still allowing hydraulic fluid to exit the hydraulic cylinder.

When an act is described herein as occurring "as a function of" or "based on" a particular thing, the system is configured so that the act is performed in different ways depending on one or more characteristics of the thing. When the act is described herein as occurring "solely as a function of" or "based exclusively on" a particular thing, the system is configured so that the act is performed in different ways depending only on one or more characteristics of the thing.

It should be understood that any one or more of the teachings, expressions, embodiments, examples, etc. described herein may be combined with any one or more of the other teachings, expressions, embodiments, examples, etc. that are described herein. The teachings, expressions, embodiments, examples, etc. herein should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A lift system, comprising:

a lift post;

a lift structure configured to actuate vertically along the lift post;

a lift structure actuation assembly configured to drive vertical actuation of the lift structure along the lift post, the lift structure actuation assembly comprising:

a hydraulic cylinder operably coupled with the lift structure, a motor, a hydraulic pump configured to pump hydraulic fluid into the hydraulic cylinder in order to vertically raise the lift structure along the lift post, wherein the motor is configured to power the hydraulic pump, and a hydraulic reservoir in fluid communication with the hydraulic pump via a first hydraulic line, a flow control assembly configured to limit hydraulic fluid exiting the hydraulic cylinder to a maximum volumetric flow rate, wherein the flow control assembly is in fluid communication with the hydraulic reservoir via a second hydraulic line, wherein the lift structure actuation assembly is configured to lower the lift structure in a fast descent mode and a slow descent mode, wherein the hydraulic pump is configured to pump hydraulic fluid toward the hydraulic cylinder in the slow descent mode such that hydraulic fluid exits the hydraulic cylinder at a slow volumetric flow rate, wherein the slow volumetric flow rate is less than the maximum volumetric flow rate.

2. The lift system of claim 1, wherein the lift structure actuation assembly, while in the fast descent mode, is configured to allow hydraulic fluid to exit the hydraulic cylinder at the maximum volumetric flow rate.

3. The lift system of claim 2, wherein the lift structure actuation assembly further comprises a hydraulic valve interposed between the flow control assembly and the hydraulic pump.

4. The lift system of claim 3, wherein the hydraulic valve has a normally closed configuration.

5. The lift system of claim 4, wherein the hydraulic valve is configured to inhibit hydraulic fluid from exiting the hydraulic cylinder into the flow control assembly in the normally closed configuration.

6. The lift system of claim 1, wherein the lift structure actuation assembly comprises a variable frequency drive configured to alter a power provided by the motor based on a measurement.

7. The lift system of claim 6, wherein the measurement comprises a load on the motor.

8. The lift system of claim 6, wherein the measurement comprises a current on the motor.

9. The lift system of claim 6, wherein the lift structure actuation assembly is configured to actuate the lift structure upward at a static speed and a dynamic speed, wherein the dynamic speed is based on the measurement.

10. The lift system of claim 1, further comprising a control pendant configured to initiate the fast descent mode and the slow descent mode.

11. The lift system for claim 10, wherein the control pendant comprises a fast descent mode button and a slow descent mode button.

12. The lift system of claim 10, wherein the control pendant is in wireless communication with the rest of the lift structure actuation assembly.

13. The lift system of claim 1, further comprising a check valve interposed between the hydraulic pump and the hydraulic cylinder.

14. The lift system of claim 1, wherein the flow control assembly comprises a pressure-compensated flow control.

15. A lift system, comprising:

a lift structure configured to actuate vertically between a lowered position and a raised position;

a lift structure actuation assembly configured to drive the lift structure between the lowered position and the raised position, the lift structure actuation assembly comprising:

a hydraulic cylinder operably coupled with the lift structure, a motor, a hydraulic pump configured to pump hydraulic fluid into the hydraulic cylinder in order to vertically raise the lift structure, wherein the motor is configured to power the hydraulic pump, a flow control assembly configured to limit hydraulic fluid exiting the hydraulic cylinder to a maximum volumetric flow rate, and a hydraulic valve interposed between the flow control assembly and the hydraulic cylinder, wherein the hydraulic valve is configured to transition between a normally closed position and an open position, wherein the lift structure actuation assembly is configured to lower the lift structure toward the lowered position in a fast descent mode and a slow descent mode while the hydraulic valve is in the open position, wherein the hydraulic pump is configured to pump hydraulic fluid toward the hydraulic cylinder in the slow descent mode such that hydraulic fluid exits the hydraulic cylinder at a slow volumetric flow rate, wherein the slow volumetric flow rate is less than the maximum volumetric flow rate.

16. The lift system of claim 15, wherein the hydraulic pump is configured to be deactivated in the fast descent mode.

17. The lift system of claim 15, further comprising a lift post, wherein the lift structure is configured to actuate vertically along the lift post between the lowered position and the raised position.

18. The lift system of claim 17, wherein the motor is mounted on the lift post.

19. A lift system, comprising:

a lift structure configured to actuate vertically between a lowered position and a raised position; and a lift structure actuation assembly configured to drive the lift structure between the lowered position and the raised position, the lift structure actuation assembly comprising:

a hydraulic cylinder operably coupled with the lift structure, a motor, a hydraulic pump configured to pump hydraulic fluid into the hydraulic cylinder in order to vertically raise the lift structure, wherein the motor is configured to power the hydraulic pump, a flow control assembly configured to regulate hydraulic fluid exiting the hydraulic cylinder to a maximum volumetric flow rate, a fluid reservoir, wherein the fluid reservoir is in fluid communication with the hydraulic pump via a first hydraulic line, wherein the fluid reservoir is in fluid communication with the flow control assembly via a second hydraulic line, wherein the lift structure actuation assembly is configured to lower the lift structure toward the lowered position in a fast descent mode and a slow descent mode, wherein the hydraulic pump is configured to pump hydraulic fluid toward the hydraulic cylinder in the slow descent mode while still allowing hydraulic fluid to exit the hydraulic cylinder at a second volumetric flow rate that is less than the maximum volumetric flow rate.

* * * * *